United States Patent
Yamada

(10) Patent No.: US 9,729,754 B2
(45) Date of Patent: Aug. 8, 2017

(54) IMAGE PROCESSING APPARATUS FOR EXPANSION PROCESSING

(71) Applicant: Oki Data Corporation, Tokyo (JP)

(72) Inventor: Hironobu Yamada, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/943,180

(22) Filed: Nov. 17, 2015

(65) Prior Publication Data

US 2016/0261767 A1 Sep. 8, 2016

(30) Foreign Application Priority Data

Mar. 6, 2015 (JP) .................................. 2015-044999

(51) Int. Cl.
*G06K 15/00* (2006.01)
*H04N 1/387* (2006.01)
*G06K 15/02* (2006.01)
*G06F 3/12* (2006.01)

(52) U.S. Cl.
CPC ......... *H04N 1/3875* (2013.01); *G06K 15/024* (2013.01); *G06K 15/1868* (2013.01)

(58) Field of Classification Search
CPC ......... G06F 17/30256; G06F 17/30265; G06F 3/1256; G06F 3/1285; G06F 3/1205; H04N 1/3875; H04N 2201/0094; H04N 1/393; H04N 1/00; H04N 1/00408; H04N 1/0057; H04N 1/2323; H04N 1/46; G06K 15/02; G06K 15/024; G06K 15/1823; G06K 15/4065
USPC .......... 358/1.1, 1.2, 1.9, 1.13–1.18; 347/8, 9
See application file for complete search history.

(56) References Cited

U.S. PATENT DOCUMENTS

| | | | | |
|---|---|---|---|---|
| 2004/0239959 A1* | 12/2004 | Yada | ................... | H04N 1/3875 358/1.2 |
| 2006/0087700 A1* | 4/2006 | Kishi | ................... | H04N 1/3873 358/453 |
| 2006/0221369 A1* | 10/2006 | Inoue | ................... | G06F 3/1204 358/1.13 |
| 2007/0024874 A1* | 2/2007 | Kawamura | ........ | H04N 1/00408 358/1.2 |
| 2008/0180708 A1* | 7/2008 | Ouchi | ...................... | B41J 29/38 358/1.9 |

(Continued)

FOREIGN PATENT DOCUMENTS

JP 2006-252369 A 9/2006

*Primary Examiner* — Gabriel Garcia
(74) *Attorney, Agent, or Firm* — Mots Law, PLLC

(57) ABSTRACT

Embodiments may include a reception processor that receives image data corresponding to an image including a plurality of image objects. A controller may determine whether image objects are in contact with a boundary of a printing area of medium, and, based on a result of the determination, may perform expansion processing on one of the plurality of image objects that is in contact with the boundary of the printing area of the medium to expand image objects in contact with the boundary of the printing area and does not perform expansion processing on image objects not in contact with the boundary of the printing area of the medium such image objects not in contact with the boundary of the printing area are not expanded. Expansion image data including the expanded image objects and image objects on which expansion processing is not performed may be generated and output.

8 Claims, 20 Drawing Sheets

(56) References Cited

U.S. PATENT DOCUMENTS

| | | | | |
|---|---|---|---|---|
| 2008/0278737 | A1* | 11/2008 | Kajihara | G06F 17/30256 358/1.9 |
| 2014/0292846 | A1* | 10/2014 | Ikagawa | B41J 11/0065 347/8 |
| 2015/0002883 | A1* | 1/2015 | Hibi | G06K 15/4065 358/1.14 |
| 2016/0124691 | A1* | 5/2016 | Nouda | G06F 3/1256 358/1.18 |

* cited by examiner

1 IMAGE PROCESSING APPARATUS

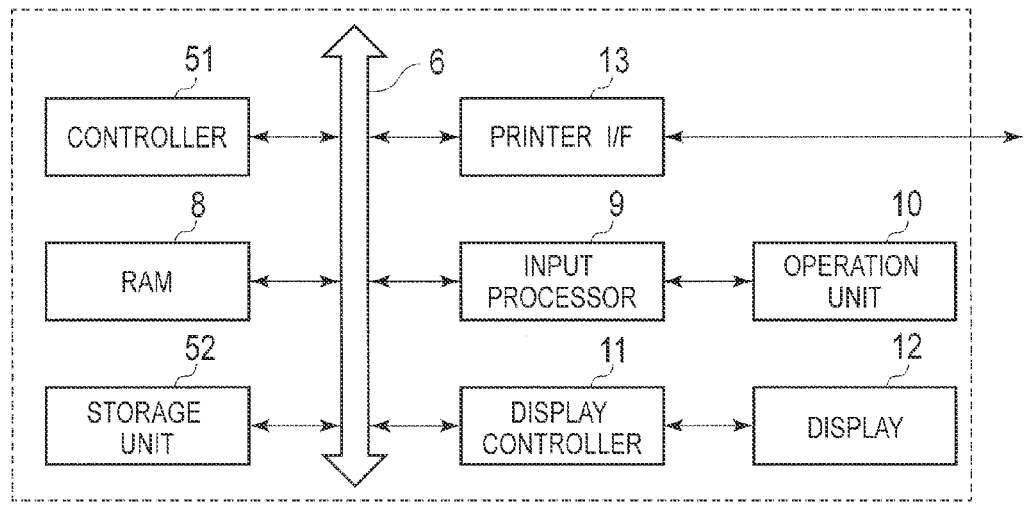

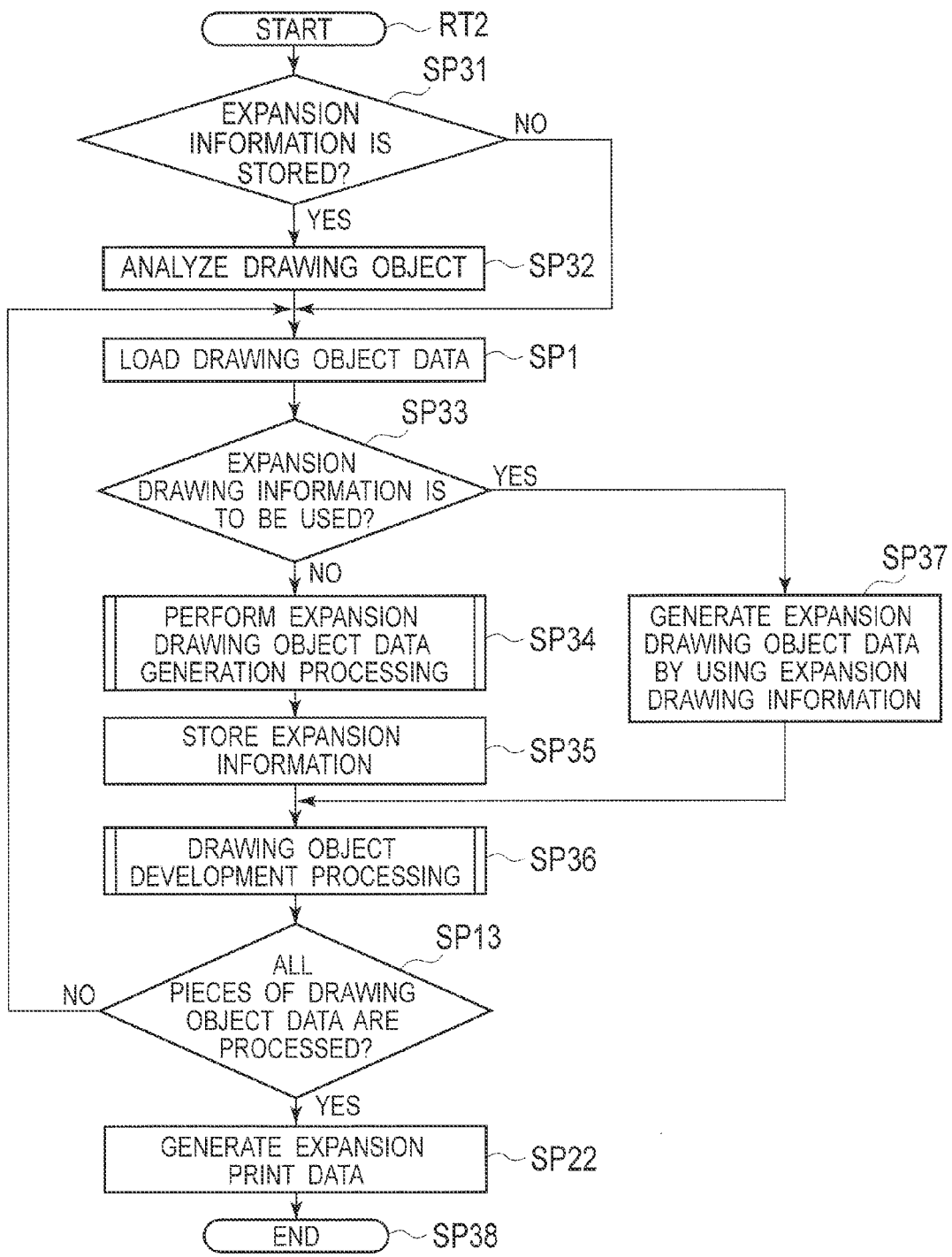

IMAGE PROCESSING APPARATUS FOR EXPANSION PROCESSING

CROSS REFERENCE TO RELATED APPLICATIONS

This application claims priority based on 35 USC 119 from prior Japanese Patent Application No. 2015-044999 filed on Mar. 6, 2015, entitled "IMAGE PROCESSING APPARATUS", the entire contents of which are incorporated herein by reference.

BACKGROUND OF THE INVENTION

1. Field of the Invention

This disclosure relates to an image processing apparatus, and is suitably applied to, for example, an image processing apparatus that performs image processing for borderless printing on an image to be printed.

2. Description of Related Art

In a conventional image processing apparatus, at the time of borderless printing, when the image size of a print image is smaller to some extent than the size of the medium to be used for printing, the print image is enlarged to an image size in which the print image extends to the periphery of the medium. The image processing apparatus thereby causes a printer to perform borderless printing of the print image on the medium, regardless of the presence or absence of a misregistration of a printing position of the print image relative to the medium (e.g., see Japanese Patent Application Publication No. 2006-252369 (page 10 and FIG. 7)).

SUMMARY OF THE INVENTION

For borderless printing in a conventional image processing apparatus, a print image is enlarged to an image size in which the print image extends to the periphery of the medium. Therefore, if there is a character or graphic on the edge of the print image, the character or graphic is out of the medium and is lost without being printed when the enlarged print image is printed on the medium. For this reason, in the conventional image processing apparatus, when relatively important information serving as information expressed by the print image is located on the edge of the print image, it is difficult to deliver the information precisely as this information is lost by the printing, which is a problem.

An object of an embodiment of the invention is to allow borderless printing of a print image without losing important information expressed by the print image.

An aspect of the invention is an image processing apparatus that includes: a data-loading unit that loads print data of a print image including one or more pieces of image data; an expansion-target detector that detects image data targeted for expansion, from among the image data included in the print data; an identification unit that identifies a characteristic of an image based on the image data targeted for expansion; an expansion processor that performs expansion processing on the image data targeted for expansion according to the characteristic of the image based on the image data targeted for expansion, thereby generating expansion image data; and an expansion-print-data generator that generates expansion print data based on the expansion image data.

According to the above aspect, it is possible to print an unexpanded image within a printing area, while printing an expanded image out of the printing area, as a print image on a surface of a medium, based on expansion print data.

Accordingly, it is possible to perform borderless printing of a print image, without losing important information expressed by the print image.

BRIEF DESCRIPTION OF THE DRAWINGS

FIG. 18 is a block diagram illustrating a circuit configuration of an image processing apparatus according to a second embodiment.

FIG. 19 is a schematic diagram illustrating a configuration of an expansion information list.

FIG. 21 is a flowchart illustrating a second image processing procedure.

DETAILED DESCRIPTION OF EMBODIMENTS

Figure 1:
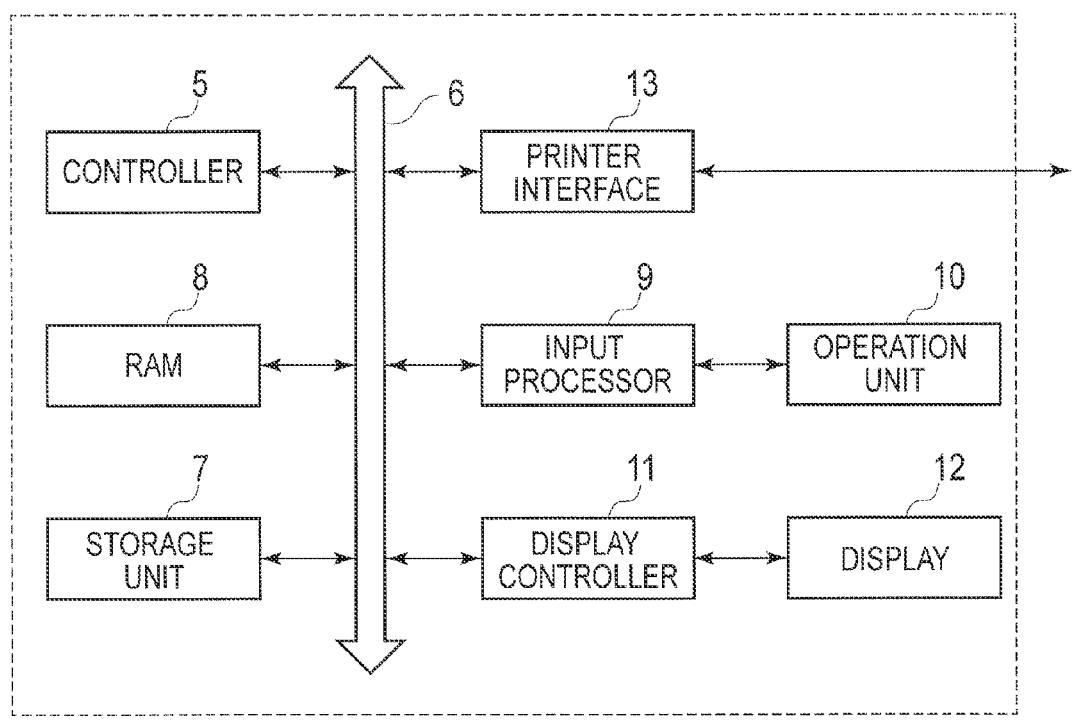
FIG. 1 is a block diagram illustrating a circuit configuration of an image processing apparatus according to a first embodiment.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

The descriptions are provided in the following order.
(1) First embodiment
(2) Second embodiment
(3) Other embodiments (1) First Embodiment (1-1) Circuit Configuration of the Image Processing Apparatus FIG. 1 illustrates image processing apparatus 1 configured, for example, as a personal computer, according to a first embodiment. Image processing apparatus 1 includes controller 5, such as a central processing unit (CPU). Further, storage unit 7 such as a hard disk drive, and random access memory (RAM) 8 that is a work area of controller 5, are connected to controller 5 via bus 6. In addition, input processor 9 is connected to controller 5 via bus 6, and operation unit 10 including components such as a keyboard and a mouse is connected to input processor 9. Furthermore, display controller 11 is connected to controller 5 via bus 6, and display 12 such as a liquid crystal display is connected to display controller 11. Still furthermore, printer interface 13 complying with a predetermined wired communication standard or a wireless communication standard is connected to controller 5 via bus 6. To printer interface 13, an external electro-photographic printer (hereinafter may also be referred to as a printer), which is not illustrated, for monochrome or color printing is connected with wire or wirelessly. Controller 5 appropriately reads and develops various programs such as a pre-stored operating system (OS), a first printer driver, and various application programs, from storage unit 7 into RAM 8. Controller 5 then controls the entire image processing apparatus 1 according to the various programs developed on RAM 8. Controller 5 also executes a predetermined arithmetic processing and various other kinds of processing according to operation commands, which are sequentially fed via input processor 9 and bus 6 in response to the user operation performed on operation unit 10.

Therefore, for example, according to the operation performed on operation unit 10 by a user, controller 5 can generate print data (hereinafter may also be referred to as label print data), which represents a print image (hereinafter may also be referred to as a label image) for label printing and includes image data of one or more images to be drawn. Further, controller 5 can store the generated print data into storage unit 7. In the following description, one of two directions parallel to an image vertical direction and opposite to each other in the label image may also be referred to as an image upward direction, and the other may also be referred to as an image downward direction. Further, one of two directions parallel to an image horizontal direction and opposite to each other may also be referred to as an image leftward direction, and the other may also be referred to as an image rightward direction. Furthermore, in the following description, the one or more images to be drawn, which are included in the label image, each may also be referred to as a drawing object, as appropriate. Examples of the drawing object include a character image such as a hiragana character, a Roman character, a number, and a sign; a line image such as any of various kinds of straight line and curved line; and a graphic image such as a graphic. Examples of the drawing object further include a bitmap image such as a photograph, an optically readable bar code, and a two-dimensional code (hereinafter may also be collectively referred to as an optically readable code). Therefore, for example, the one or more drawing objects included in the label image may be roughly classified into the following four types: "character", "line", "graphic", and "bitmap".

For example, when a label image to be printed is selected by the user via operation unit 10, controller 5 reads label print data of the selected label image from storage unit 7, into RAM 8. Subsequently, when a printing of the label image is requested by the user via operation unit 10, controller 5 reads pre-stored printing setting screen data from storage unit 7, and sends this data to display 12 via display controller 11. Controller 5 thereby displays a printing setting screen (not illustrated) on display 12, based on the printing setting screen data. In this state, when a medium for label printing is selected on the printing setting screen by the user via operation unit 10, controller 5 generates drawing object data for each drawing object included in the label image, based on the label print data, according to the selected medium.

Figure 2:
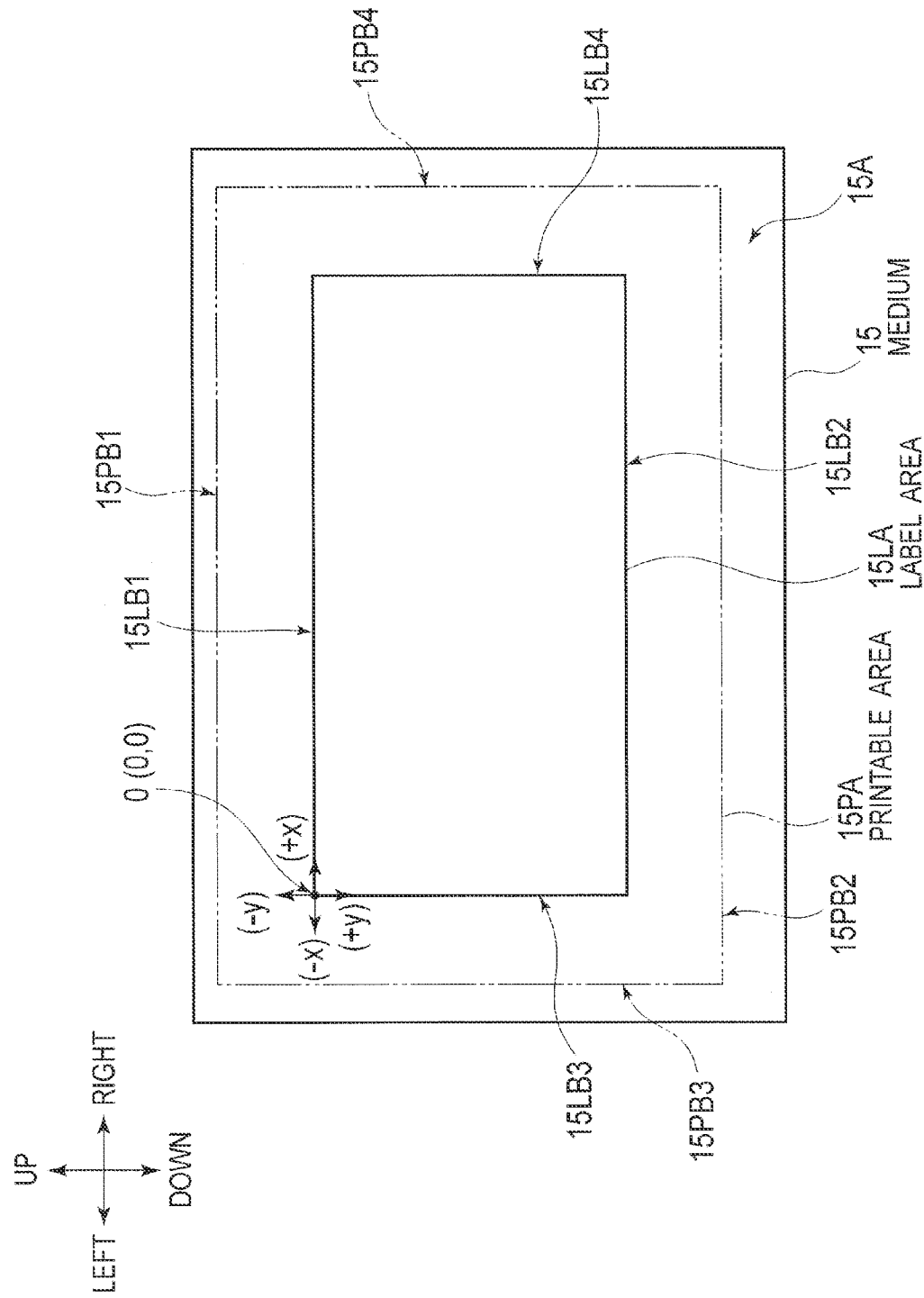
FIG. 2 is a schematic top view illustrating a configuration of a medium for label printing.

As illustrated in FIG. 2, medium 15 for the label printing is formed, for example, in the shape of a rectangle. Rectangular printing area (hereinafter may also be referred to as a label area) 15LA for the label printing, which is of a smaller size than a printable area size, is provided inside physical printable area 15PA on surface 15A. In the following description, the size of label area 15LA on medium 15 may also be referred to as a label area size. Further, in the following description, when the label image is printed on medium 15, the four directions which correspond to the image upward direction, the image downward direction, the image leftward direction, and the image rightward direction, may also be referred to as a medium upward direction, a medium downward direction, a medium leftward direction, and a medium rightward direction. Therefore, when medium 15 for the label printing is selected by the user, controller 5 generates the drawing object data, by storing, together with type information indicating the type of the drawing object, drawing format information indicating a drawing format on medium 15, and drawing position information indicating a drawing position in label area 15LA of the drawing object, according to the selected medium 15. Controller 5 then generates print data for the label image storing the drawing object data of the one or more drawing objects included in the label image. In this way, controller 5 generates the print data for printing the label image on label area 15LA of medium 15, in an image size equal to the label area size.

Controller 5 applies, for example, a coordinate system to surface 15A of medium 15, thereby expressing coordinates of each of two or more positions at the time of image printing on this surface 15A. In this coordinate system, using a dot position at the upper left corner of label area 15LA as origin point O, an x-coordinate on the right of origin point O and a y-coordinate below origin point O, each is converted into a positive value. Further, an x-coordinate on the left of origin point O and a y-coordinate above origin point O are each converted into to a negative value. Therefore, controller 5 also indicates the drawing position of the drawing object within label area 15LA in the drawing object data, with the coordinates of the dot position to which the coordinate system of surface 15A of medium 15 is applied. In the following description, the perimeter of label area 15LA on surface 15A of medium 15 may also be referred to as a label-area boundary line. In this label-area boundary line, four linear parts 15LB1 to 15LB4 on a medium upper end side, a medium lower end side, a medium left end side, and a medium right end side may also be referred to as label-area upper boundary line 15LB1, label-area lower boundary line 15LB2, label-area left boundary line 15LB3, and label-area right boundary line 15LB4, respectively. Further, in the following description, the perimeter of printable area 15PA on surface 15A of medium 15 may also be referred to as a printable-area boundary line. In this printable-area boundary line, four linear parts 15PB1 to 15PB4 on the medium upper end side, the medium lower end side, the medium left end side, and the medium right end side may also be referred to as printable-area upper boundary line 15PB1, printable-area lower boundary line 15PB2, printable-area left boundary line 15PB3, and printable-area right boundary line 15PB4, respectively.

Figure 3:
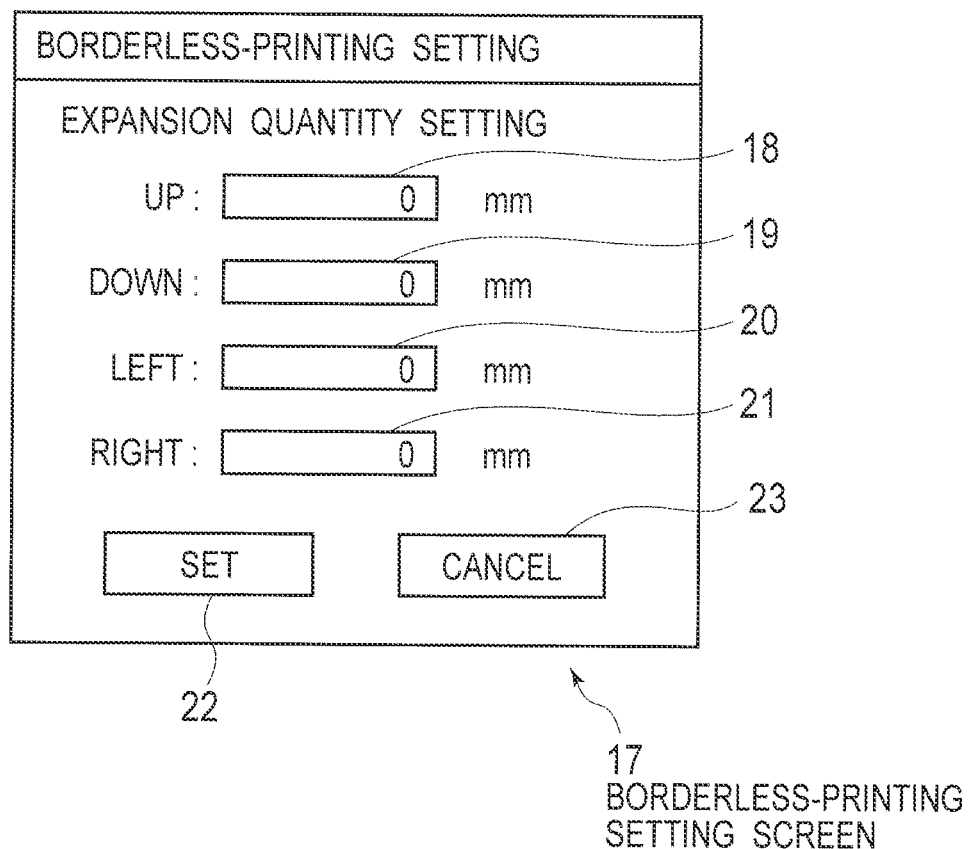
FIG. 3 is a schematic diagram illustrating a configuration of a borderless-printing setting screen.

In addition, for example, when the display of a borderless-printing setting screen is requested by the user via operation unit 10, controller 5 reads pre-stored borderless-printing setting screen data from storage unit 7. Controller 5 then sends out the borderless-printing setting screen data to display 12 via display controller 11, thereby displaying, in addition to the printing setting screen, borderless-printing setting screen 17 illustrated in FIG. 3 on display 12, based on the borderless-printing setting screen data. Borderless-printing setting screen 17 includes first to fourth expansion quantity input sections 18 to 21. Expansion quantity input sections 18 to 21 are provided for inputting expansion quantities of the image size in printing the print label image on medium 15, for the four directions of the image upward direction, the image downward direction, the image leftward direction, and the image rightward direction, respectively. Borderless-printing setting screen 17 further includes set button 22 and cancel button 23. Set button 22 is used to provide an instruction for setting, by determining the expansion quantity inputted into each of first to fourth expansion quantity input sections 18 to 21. Cancel button 23 is used to cancel the setting of this expansion quantity. In this case, controller 5 allows the user to input the expansion quantity of the image size into each of first to fourth expansion quantity input sections 18 to 21 on borderless-printing setting screen 17, as a numerical value in [mm] in a range from the label area size to the printable area size.

In other words, when the user desires to print the label image on medium 15 in an image size equal to the label area size, controller 5 allows the user to input a value of "0" into each of first to fourth expansion quantity input sections 18 to 21, as the expansion quantity. Further, when the user desires to print the label image on medium 15 in an image size larger than the label area size, controller 5 allows the user to input an arbitrary value into at least one of first to fourth expansion quantity input sections 18 to 21, as the expansion quantity. The arbitrary value is greater than "0" and equal to or less than a maximum value, which corresponds to each of the respective distances between label-area upper boundary line 15LB1, label-area lower boundary line 15LB2, label-area left boundary line 15LB3, and label-area right boundary line 15LB4, and corresponding printable-area upper boundary line 15PB1, printable-area lower boundary line 15PB2, printable-area left boundary line 15PB3, and printable-area right boundary line 15PB4. When set button 22 is then selected and operated on borderless-printing setting screen 17, controller 5 sets the expansion quantity inputted into each of first to fourth expansion quantity input sections 18 to 21. In other words, controller 5 sets the printing of the label image on surface 15A of medium 15 in an image size equal to or greater than the label area size, and equal to or less than the printable area size, and corresponds to the expansion quantity. In the following description, the image size equal to the label area size in the label image may also be referred to as a reference image size, and the image size when expanded to be larger than the label area size may also be referred to as an expansion image size.

Figure 4:
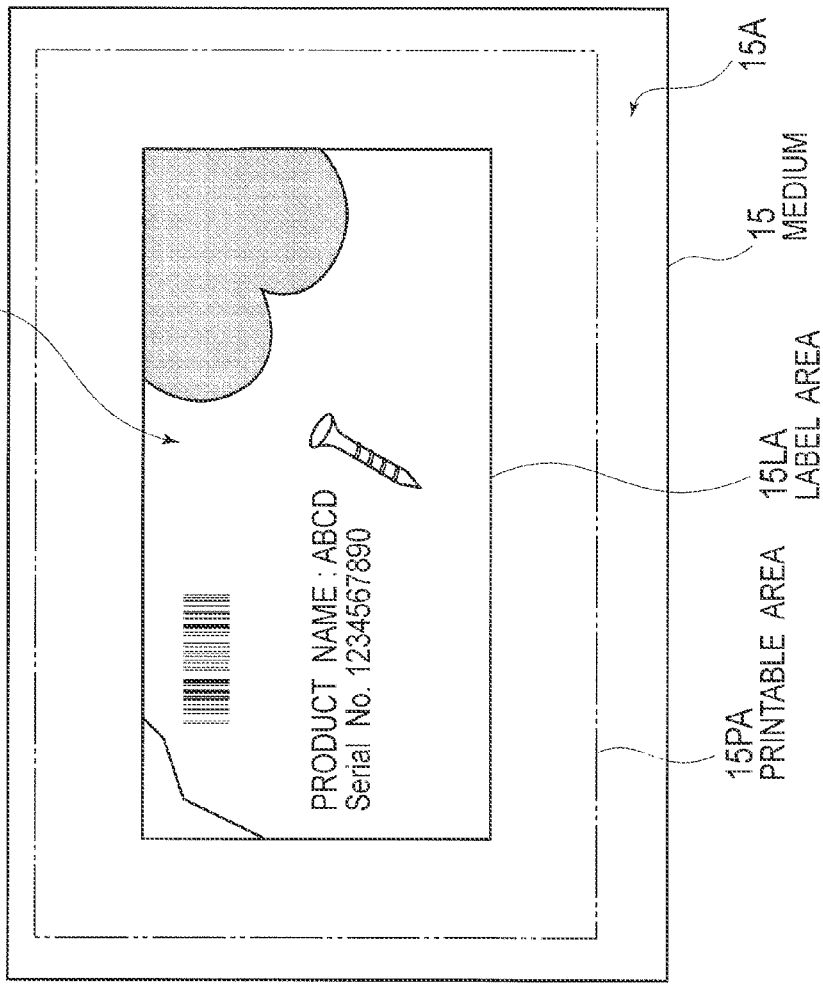
FIG. 4 is a schematic top view used for describing printing of a label image in a label area of a medium.

Subsequently, when an instruction for executing printing of the label image is provided on the printing setting screen by the user via operation unit 10, controller 5 in response to this instruction executes first image processing on the label image. In this case, when the label image is set to be printed on surface 15A of medium 15 in the reference image size, controller 5 performs expansion processing for the borderless printing, on none of one or more pieces of the drawing object data stored in the print data. Further, for example, when the printer does not have a function of developing a drawing object into an image for printing, controller 5 develops each of the drawing objects indicated by the one or more pieces of the drawing object data stored in the print data, on RAM 8. Controller 5 then converts each of the drawing objects developed on RAM 8 into an image command interpretable by the printer, and generates print data storing these image commands. In contrast, for example, when the printer has the function of developing a drawing object into an image for printing, controller 5 converts the one or more pieces of the drawing object data stored in the print data, into a command described in a page description language interpretable by the printer, e.g., a PDL (page description language) command. Controller 5 then generates print data storing these image commands. In this way, controller 5 generates the print data interpretable by the printer, and transmits the generated print data to the printer via printer interface 13. As illustrated in FIG. 4, controller 5 can thereby cause the printer to print label image 25 of the reference image size in label area 15LA on surface 15A of medium 15, based on the print data.

Figure 5:
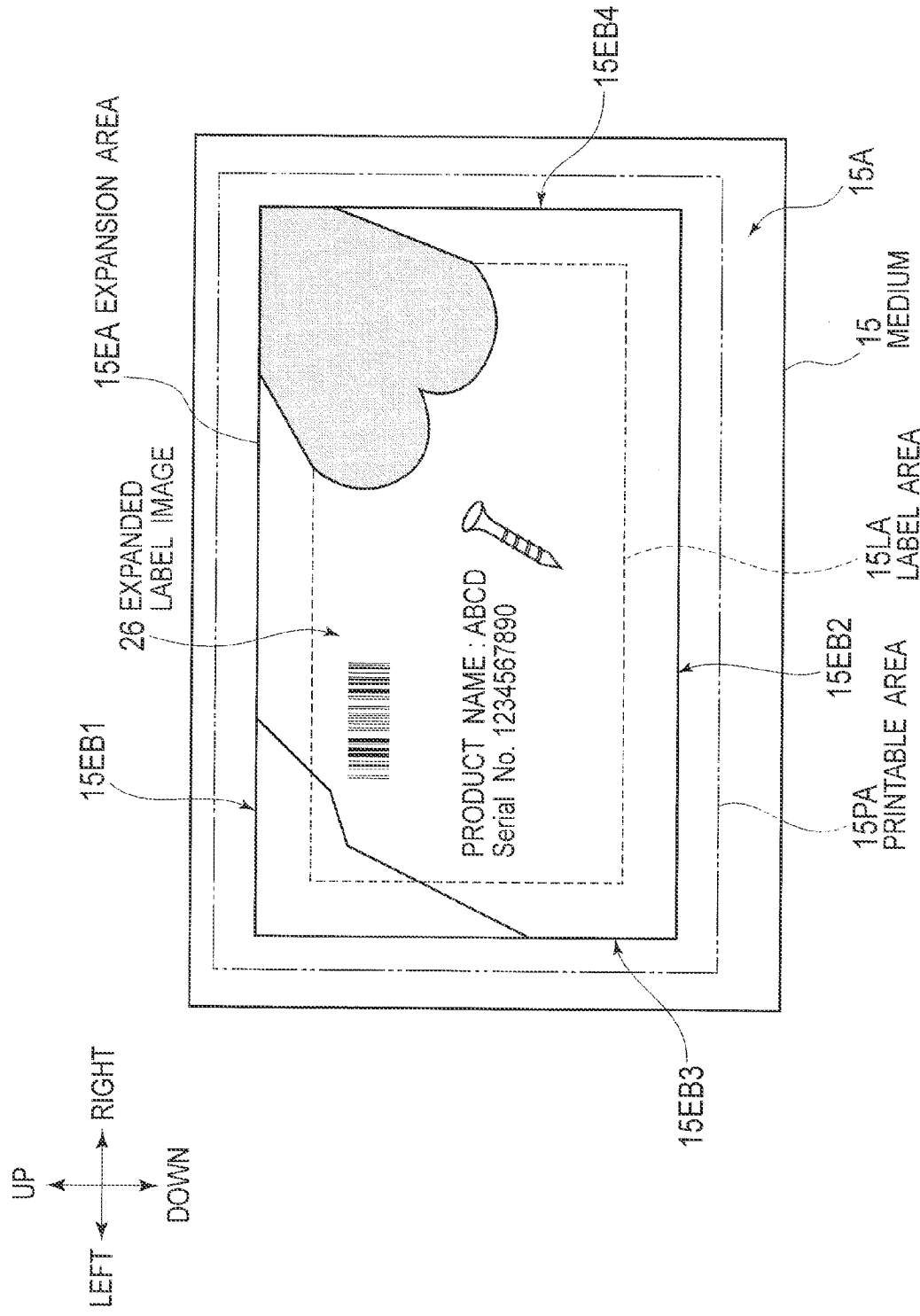
FIG. 5 is a schematic top view used for describing printing of an expanded label image in an expansion area of a medium.

In contrast, when the label image is set to be printed on surface 15A of medium 15 in the expansion image size, controller 5 performs the expansion processing for the borderless printing, on a specific type of drawing object data to be described later, among the one or more pieces of the drawing object data stored in the print data. Controller 5 thereby generates expansion drawing object data of the expanded drawing object expanded for the borderless printing. In this way, controller 5 can generate an expanded label image, by appropriately expanding the label image on a drawing object basis. Controller 5 then converts the expanded drawing object indicated by the expansion drawing object data, into an image command by developing the expanded drawing object, or into a PDL command without performing the development, in a manner similar to that described above. In this process, as for the drawing object data not to be subjected to the expansion processing in particular, controller 5 converts the drawing object indicated by this drawing object data, in a manner similar to that described above, into an image command by developing the drawing object, or into a PDL command without performing the development. Therefore, controller 5 generates the print data (hereinafter may also be referred to as expansion print data) that stores the image command or PDL command indicating the expanded drawing object, and the image command or PDL command indicating the drawing object. Controller 5 then transmits the expansion print data to the printer via printer interface 13. Therefore, for example, as illustrated in FIG. 5, controller 5 can cause the printer to print expanded label image 26, in expansion area 15EA of a larger size than label area 15LA, on surface 15A of medium 15, based on the expansion print data. Expanded label image 26 is of an expansion image size equal to the size of expansion area 15EA.

Figure 6:
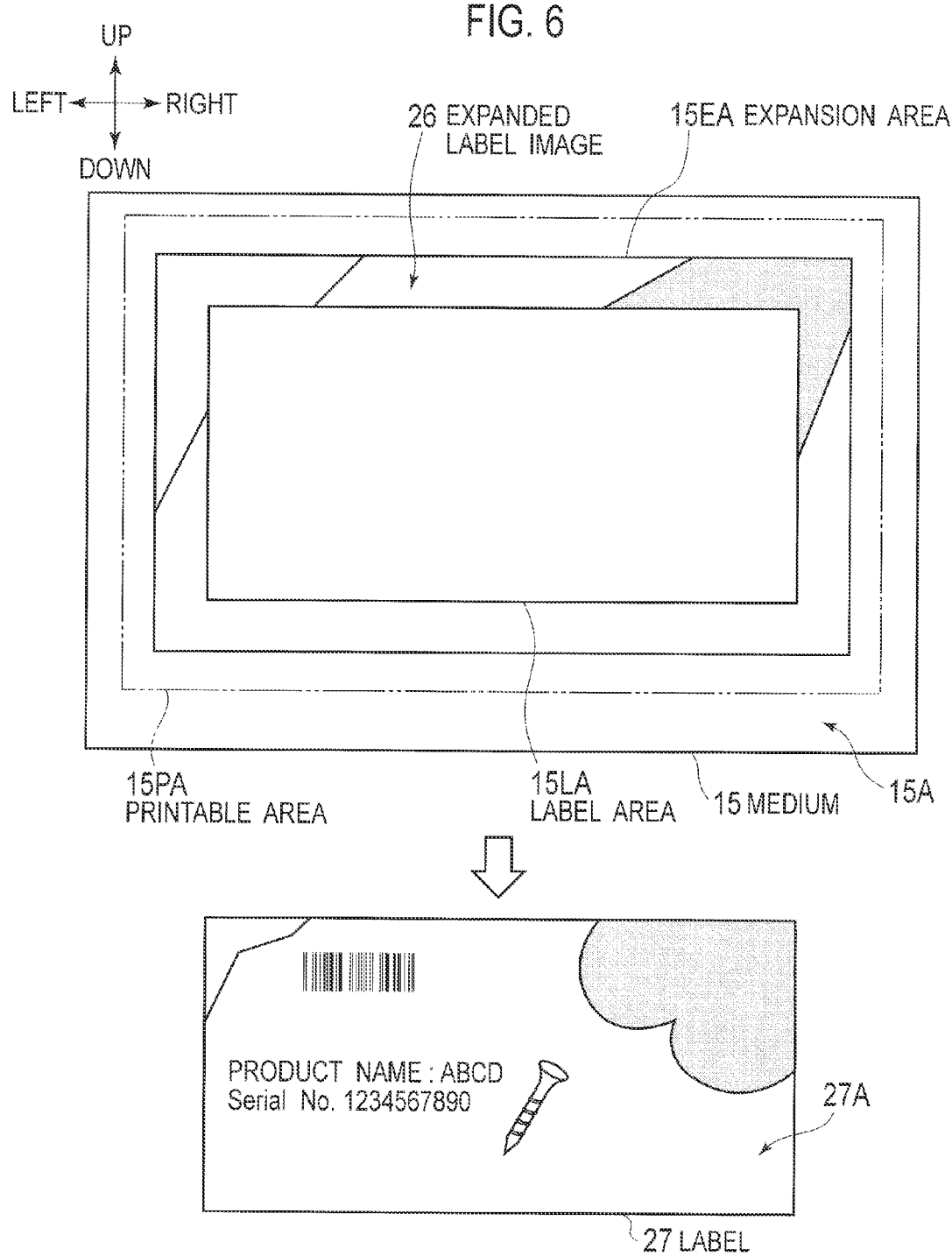
FIG. 6 is a schematic top view used for describing the cutting out of a label from a medium.

In the following description, the size of expansion area 15EA on medium 15 may also be referred to as an expansion area size. Further, in the following description, the perimeter of expansion area 15EA on surface 15A of medium 15 may also be referred to as an expansion-area boundary line. In this expansion-area boundary line, four linear parts 15EB1 to 15EB4 on the medium upper end side, the medium lower end side, the medium left end side, and the medium right end side may also be referred to as expansion-area upper boundary line 15EB1, expansion-area lower boundary line 15EB2, expansion-area left boundary line 15EB3, and expansion-area right boundary line 15EB4, respectively. Subsequently, as illustrated in FIG. 6, when expanded label image 26 (and label image 25) is printed, a part of medium 15 for the label printing, the part corresponding to label area 15LA, is cut out along the label-area boundary line, as label 27 to be affixed to a product or the like. When expanded label image 26 is printed on surface 15A of medium 15 in the printer, the printing position of expanded label image 26 relative to surface 15A of medium 15 is slightly deviated. Even so, controller 5 can implement the borderless printing of the label image that can evade formation of an unintended margin at an end part of surface 27A of label 27 cut out from medium 15 along the label-area boundary line.

As illustrated in FIG. 5 and FIG. 6, of expanded label image 26 printed on surface 15A of medium 15, the part corresponding to label area 15LA is cut out from medium 15, as label 27. For this reason, of expanded label image 26, a peripheral part out of label area 15LA on surface 15A of medium 15 remains on surface 15A, by the cutting out of label 27. Therefore, when generating the expanded label image, information expressed by original label image 25 as the peripheral part of expanded label image 26 is partially lost by cutting out label 27 from medium 15. However, controller 5 expands only the specific type of drawing object not affecting the expression of this information. Specifically, controller 5 treats a drawing object whose type is "line" or "graphic" among the four types of drawing objects included in the label image 25, as an expansion target when generating expanded label image 26. This is because this type of drawing object is considered to be a drawing object not particularly affecting the information expressed by original label image 25, even if a part thereof is lost as a peripheral part of expanded label image 26 by cutting out label 27 from medium 15. In contrast, controller 5 excludes a drawing object whose type is a "character" from expansion targets when generating expanded label image 26. This is because, if a part of this type of drawing object is lost as a peripheral part of expanded label image 26 by cutting out label 27 from medium 15, precisely delivering information expressed by a character image may be difficult. Controller 5 also excludes a drawing object whose type is "bitmap", described above as an optically readable code and a photograph or the like, from the expansion targets when generating expanded label image 26. This is because, if a part of this type of drawing object is lost as a peripheral part of expanded label image 26 by cutting out label 27 from medium 15, it may also be difficult to deliver information precisely.

Further, actually, controller 5 executes the first image processing according to the first printer driver. In the following description, the first printer driver for executing the first image processing may also be referred to as a first image processing program, as appropriate. Therefore, when the label image is set to be printed on surface 15A of medium 15 in the expansion image size, controller 5 performs the expansion processing on the drawing object data of the drawing object targeted for expansion in the first image processing. Accordingly, various functions implemented by controller 5 according to the first image processing program are illustrated as functional circuit blocks in FIG. 7, for convenience. Further, various kinds of processing, which are executed by controller 5 as the first image processing according to the first image processing program, in a state where the label image is set to be printed on surface 15A of medium 15 in the expansion image size, are specifically described below as processes executed by these functional circuit blocks. For example, at the time of printing, controller 5 reads label print data from storage unit 7 according to the operating system into RAM 8 (not illustrated in FIG. 7), and generates print data based on the label print data in RAM 8, in response to the user selecting medium 15 for the label printing.

Figure 7:
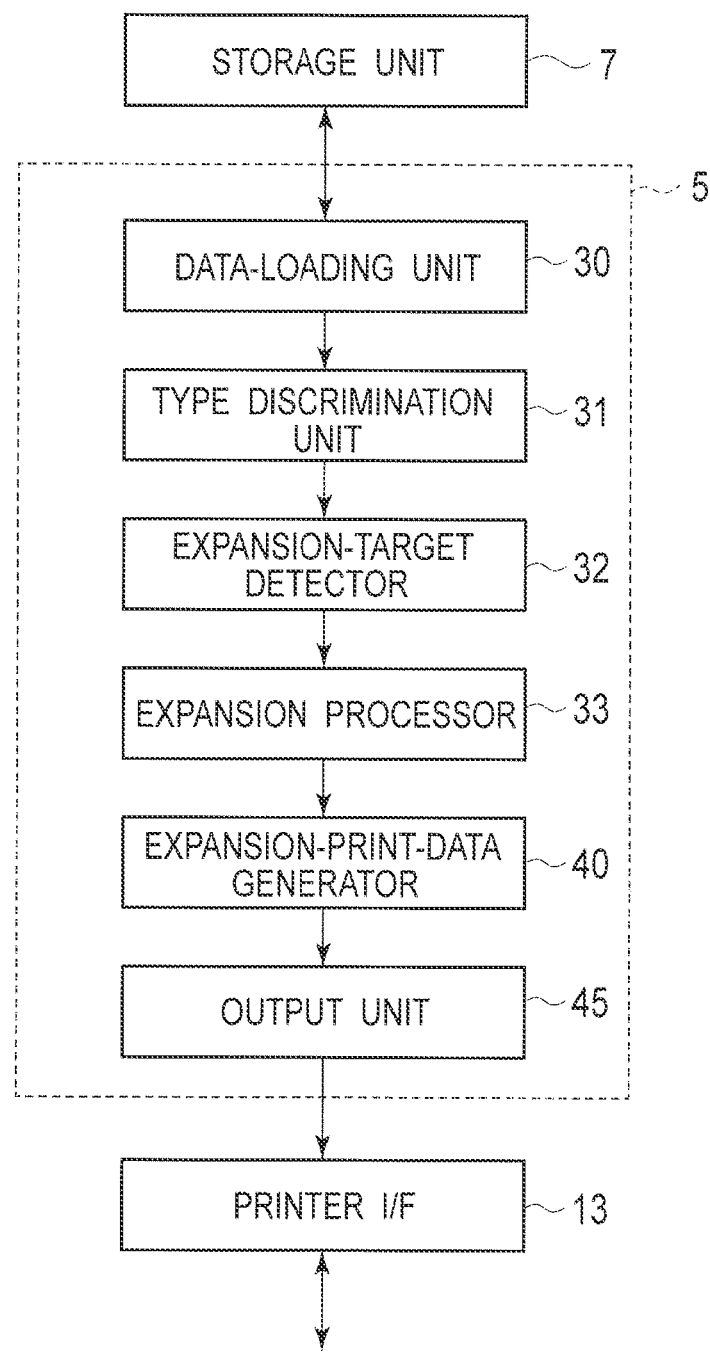
FIG. 7 is a block diagram illustrating functional circuit blocks used for describing first image processing executed by a controller.

As illustrated in FIG. 7, at the time of printing, data-loading unit 30 sequentially loads each piece of drawing object data as print data from RAM 8, and sends out the loaded drawing object data to type discrimination unit 31. For example, each time the drawing object data is provided from data-loading unit 30, type discrimination unit 31 discriminates the type of the drawing object based on the type of information stored in the drawing object data. Further, type discrimination unit 31 sends out the drawing object data to expansion-target detector 32, together with type discrimination information indicating the discriminated type. For example, data-loading unit 30 loads the drawing object data in the print data, in a predetermined order according to a device driver interface (DDI) function that is uniquely determined for each type of drawing object and is implemented for the first image processing program (the first printer driver). Therefore, for example, type discrimination unit 31 can also discriminate the type of the drawing object indicated by the drawing object data, by using the order of the loading of the drawing object data according to the DDI function by data-loading unit 30, instead of discriminating the type of the drawing object based on the type of information stored in the drawing object data.

Each time the drawing object data is provided from type discrimination unit 31 together with the type discrimination information, expansion-target detector 32 detects whether the drawing object is targeted for expansion, based on the type discrimination information. In this case, expansion-target detector 32 treats the drawing object whose type is "line" or "graphic" as the expansion target as described above. In contrast, expansion-target detector 32 excludes the drawing object whose type is "character" or "bitmap", from the expansion targets. Expansion-target detector 32 then sends out the drawing object data to expansion processor 33, together with detection result information indicating a result of detecting whether the drawing object is targeted for expansion.

Each time the drawing object data is provided from expansion-target detector 32 together with the detection result information, expansion processor 33 determines whether the drawing object is targeted for expansion, based on the detection result information. As a result, for example, expansion processor 33 identifies the type (i.e., "line" or "graphic") indicated by the type of information in the drawing object data, as a characteristic of the drawing object, when the drawing object is targeted for expansion. Further, expansion processor 33 extracts drawing position information from the drawing object data. The drawing object data of the drawing object whose type is "line" stores the drawing position information indicating the drawing position of the drawing object relative to label area 15LA, as coordinates of each of the dot positions through which a line image serving as the drawing object runs. The drawing object data of the drawing object whose type is "graphic" stores the drawing position information indicating the drawing position of the drawing object relative to label area 15LA, as coordinates of each of the dot positions through which the outline of the graphic image serving as the drawing object runs. Expansion processor 33 then executes the expansion processing according to the characteristic (i.e., the type) of the drawing object for expanding the drawing object targeted for expansion, by using the drawing position information.

Figure 8:
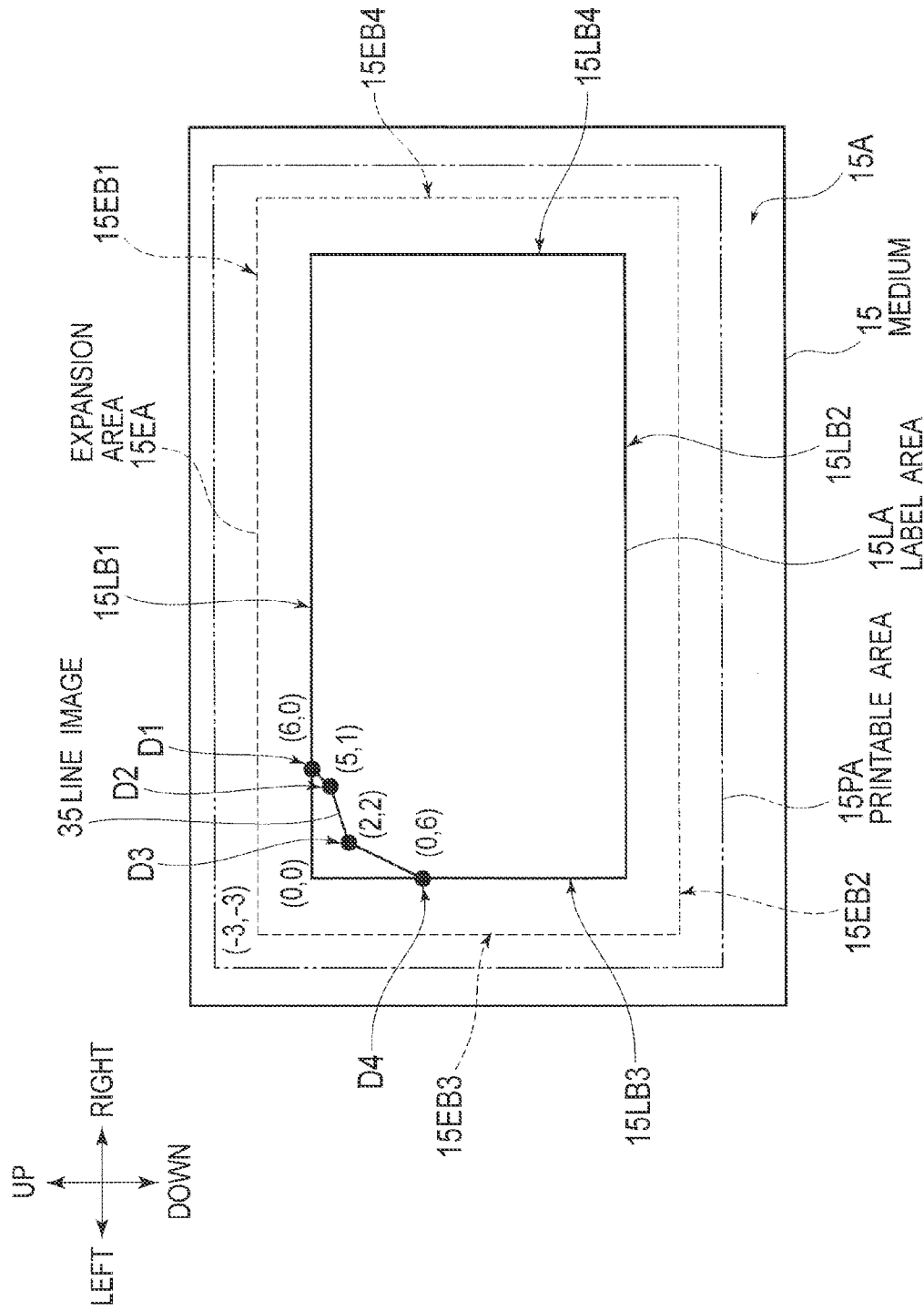
FIG. 8 is a schematic top view used for describing a line image serving as a drawing object targeted for expansion.

Here, the expansion processing executed by expansion processor 33 is specifically described, by taking, as an example, a case where the drawing object whose type is "line" is line image 35 of a bending line illustrated in FIG. 8. In this example, it is assumed that one end and the other end of line image 35 is in contact with the label-area boundary line, and the image size of the label image is set to expand at least in an upward direction and a leftward direction. In this case, upon identifying the characteristic of the drawing object, expansion processor 33 extracts the drawing position information from the drawing object data. Expansion processor 33 then detects whether the one end and the other end of line image 35 are in contact with the label-area boundary line, based on the drawing position information and the coordinates indicating the position of the label-area boundary line.

In this process, when the drawing position information indicates, for example, coordinates (6, 0), (5, 1), (2, 2), and (0, 6) of first dot position D1 to fourth dot position D4, respectively, the coordinates (0, 6) of first dot position D1 are on label-area upper boundary line 15LB1 expressed by y=0. Therefore, expansion processor 33 determines that line image 35 is in contact with label-area upper boundary line 15LB1, at first dot position D1 that is the one end. Further, the coordinates (0, 6) of fourth dot position D4 is on label-area left boundary line 15LB3 expressed by x=0, and therefore, expansion processor 33 determines that line image 35 is in contact with label-area left boundary line 15LB3 at fourth dot position D4 that is the other end.

Figure 9:
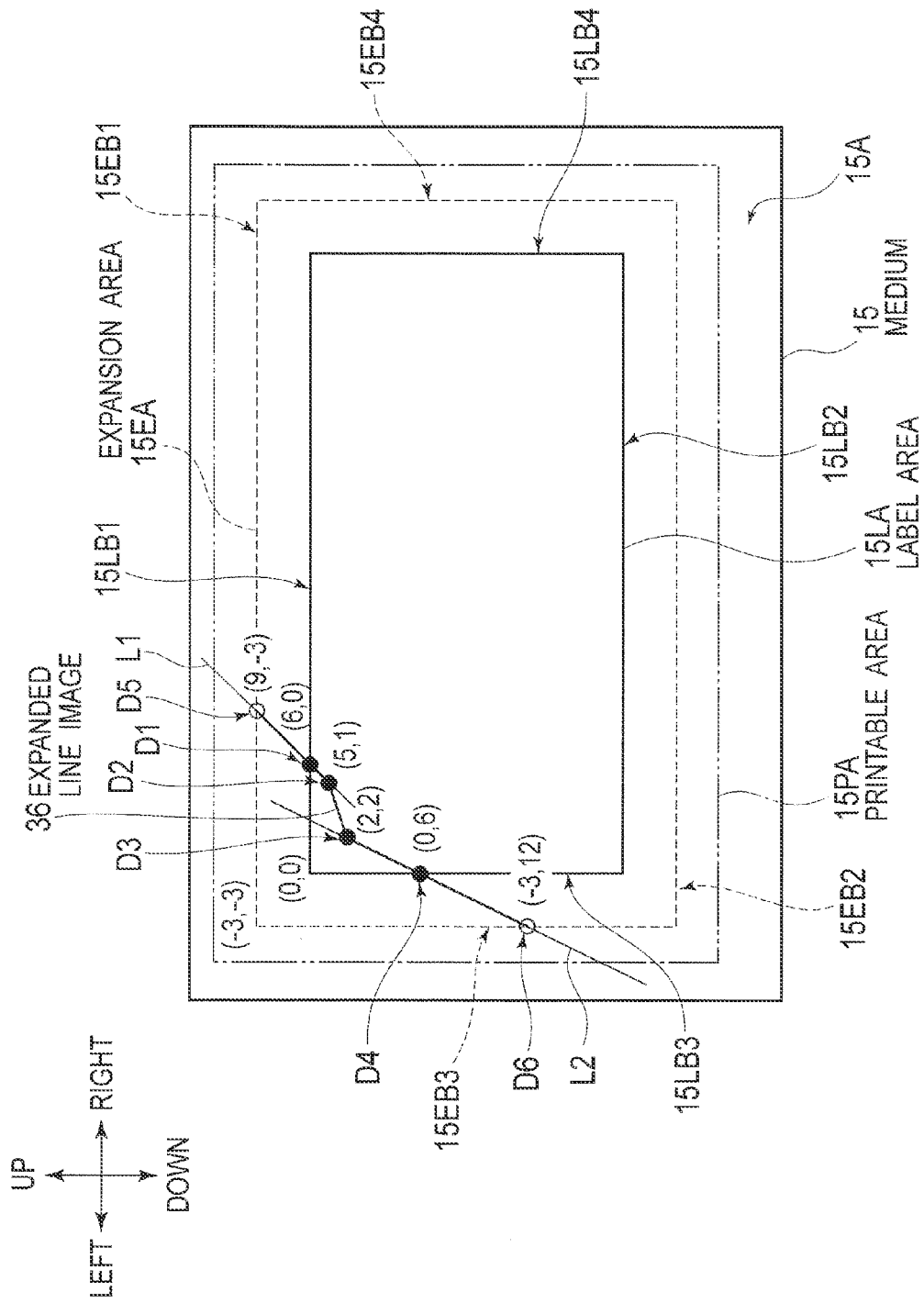
FIG. 9 is a schematic top view used for describing the expansion of the line image serving as the drawing object.

Further, as illustrated in FIG. 9, when the image size of the label image is set to expand at least in two directions of the upward direction and the leftward direction as described above, expansion processor 33 determines first straight line L1 passing through first dot position D1 and second dot position D2. First straight line L1 is expressed by the following formula (1), and is determined based on the coordinates of first dot position D1 in contact with label-area upper boundary line 15LB1 in line image 35, and the coordinates of second dot position D2 which is next to first dot position D1 in label area 15LA (i.e., inside the label-area boundary line).

$$y=-x+6 \qquad (1)$$

Further, for example, assume that an expansion quantity selected in [mm] for expansion in the upward direction of the image size is equivalent to 3 dots when converted into dots. In this case, when line image 35 is expanded (i.e., extended) upward, expansion processor 33 determines a position in contact with expansion-area upper boundary line 15EB1 expressed by y=−3, as coordinates (9, −3) of fifth dot position D5 that is an intersection between expansion-area upper boundary line 15EB1 and first straight line L1. Furthermore, expansion processor 33 determines second straight line L2 passing through fourth dot position D4 and third dot position D3. Second straight line L2 is expressed by the following formula (2), and is determined based on the coordinates of fourth dot position D4 of the other end in contact with label-area left boundary line 15LB3 in line image 35, and the coordinates of third dot position D3 next to the coordinates of fourth dot position D4 in label area 15LA (i.e., inside the label-area boundary line).

$$y=-2x+6 \qquad (2)$$

Still furthermore, for example, assume that an expansion quantity selected in [mm] for expansion in the leftward direction of the image size is equivalent to 3 dots when converted into dots. In this case, when line image 35 is expanded (i.e., extended) leftward, expansion processor 33 determines a position in contact with expansion-area left boundary line 15EB3 expressed by x=−3, as coordinates (−3, 12) of sixth dot position D6 that is an intersection between expansion-area left boundary line 15EB and second straight line L2. In this way, expansion processor 33 determines the coordinates of each of fifth dot position D5 and sixth dot position D6 that become the new one end and the new other end, respectively, when line image 35 is expanded. Expansion processor 33 then updates the drawing position information indicating the drawing position of line image 35 in the drawing object data, by adding the coordinates of each of fifth dot position D5 and sixth dot position D6 that become the new one end and the new other end when line image 35 is expanded. Expansion processor 33 can thereby generate drawing position information (hereinafter may also be referred to as expansion drawing position information) indicating the drawing position of expanded line image 36 resulting from the expansion of line image 35, based on the drawing position information indicating the drawing position of line image 35.

The drawing position information indicating the drawing position of line image 35 is, actually, the information that also defines the shape and length of line image 35. It defines the shape and length of line image 35 by indicating the coordinates of each of first dot position D1 to fourth dot position D4 through which line image 35 runs in the drawing, as described above. Therefore, the expansion drawing position information indicating the drawing position of expanded line image 36 likewise defines the shape and length of expanded line image 36, by indicating the coordinates of each of first dot position D1 to sixth dot position D6 through which expanded line image 36 runs in the drawing. In addition, the drawing object data of the drawing object whose type is "line" stores the drawing format information indicating the type, thickness, and color of line image 35 that is the drawing format of line image 35 serving as the drawing object. This drawing format information indicates in what drawing format line image 35 is to be drawn, irrespective of the shape and length (i.e., the drawing position) of line image 35, and thus is applicable as-is to the drawing of expanded line image 36 obtained by expanding line image 35. Therefore, expansion processor 33 can generate the expansion drawing object data indicating expanded line image 36, based on the drawing object data. The drawing object data indicates line image 35, by updating the drawing position information in the drawing object data to indicate line image 35 to the expansion drawing position information.

In this way, expansion processor 33 can generate expanded line image 36 obtained by expanding line image 35, targeted for expansion, to extend from label area 15LA to the expansion-area boundary line of expansion area 15EA, and can also generate the expansion drawing object data indicating expanded line image 36. Even if, for example, only one end of a line image serving as the drawing object is in contact with the label-area boundary line (i.e., if the other end is separated), expansion processor 33 can generate expansion drawing object data together with an expanded line image obtained by expanding the line image toward only one side, by executing expansion processing similar to that described above. In addition, even if the drawing object targeted for expansion is a line image of a straight line or a curved line, expansion processor 33 can generate expansion drawing object data together with an expanded line image by executing expansion processing similar to that described above. Meanwhile, for example, if a line image serving as the drawing object is away from (i.e., not at all in contact with) the label-area boundary line, expansion processor 33 does not expand the line image in particular.

Figure 10:
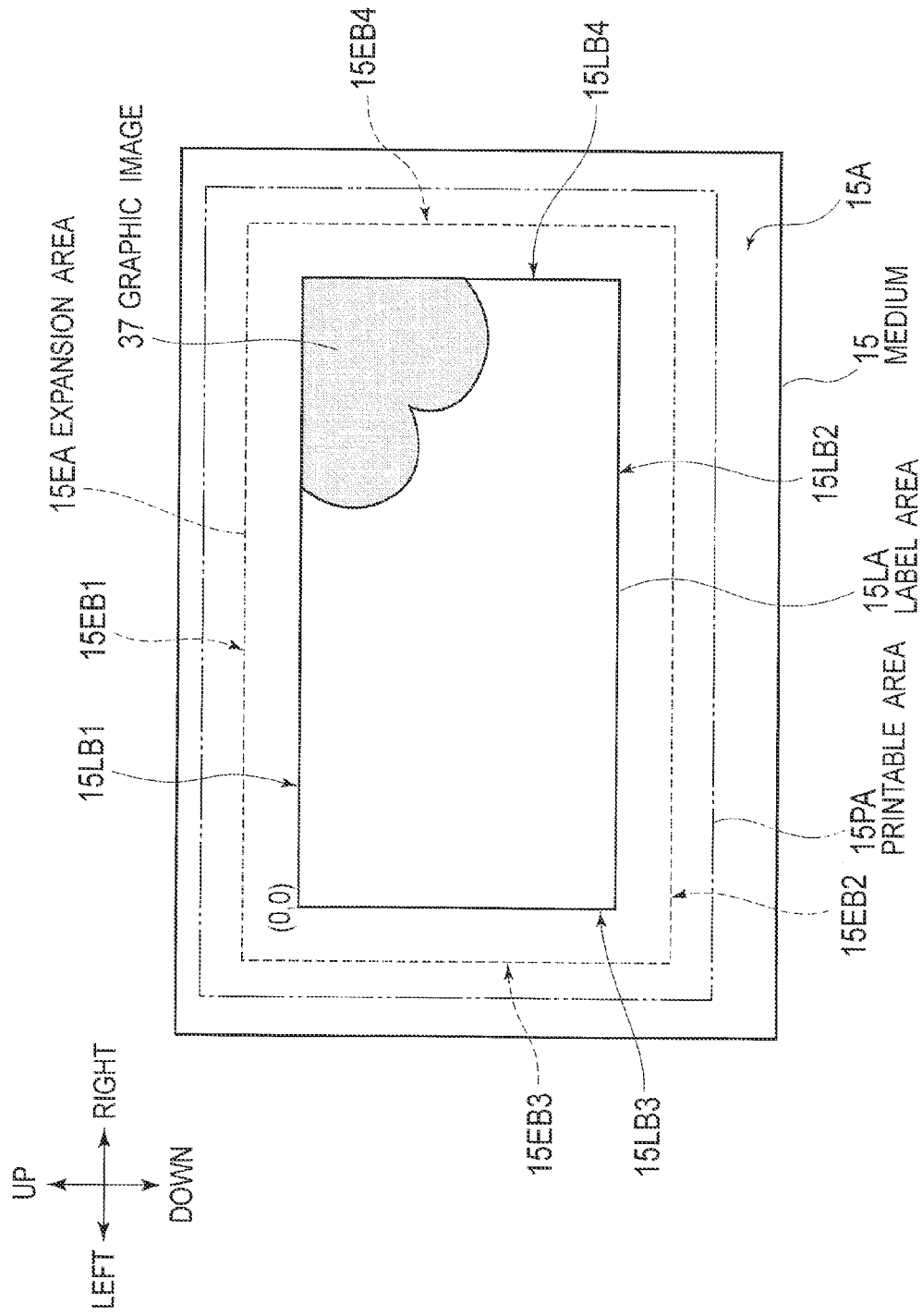
FIG. 10 is a schematic top view used for describing a graphic image serving as a drawing object targeted for expansion.

Next, the expansion processing executed by expansion processor 33 is specifically described by taking, as an example, a case where the drawing object whose type is "graphic" is graphic image 37 having an outline formed by combining a curved line and a straight line as illustrated in FIG. 10. In this example, it is assumed that an end part of graphic image 37 is in contact with the upper right corner of the label-area boundary line, and the image size of the label image is set to expand at least in the two directions of an upward direction and a rightward direction. In this case, upon identifying the characteristic of the drawing object, expansion processor 33 extracts the drawing position information from the drawing object data. Expansion processor 33 then detects whether the outline of graphic image 37 is in contact with the label-area boundary line, based on the drawing position information and the coordinates indicating the position of the label-area boundary line.

Figure 11:
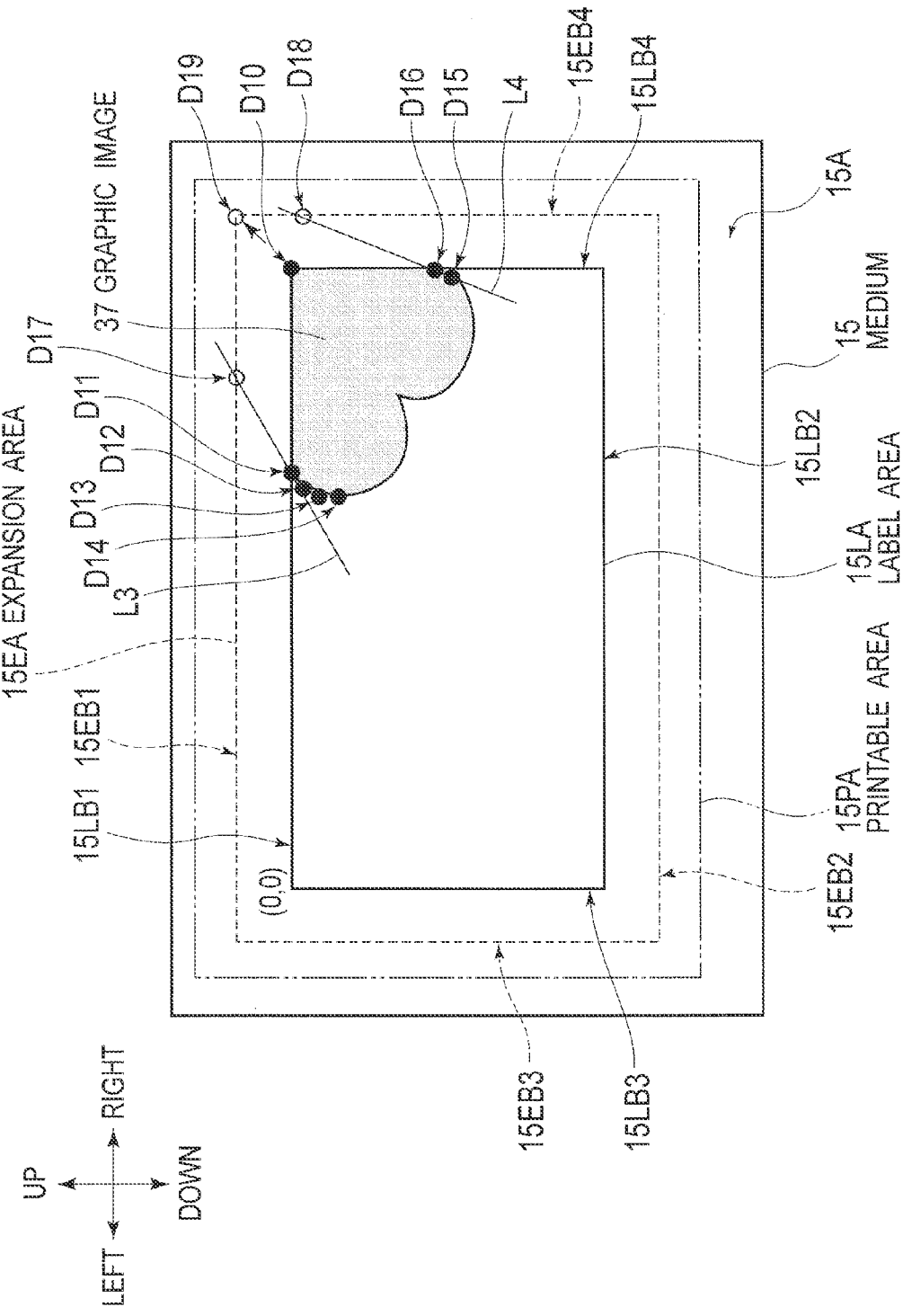
FIG. 11 is a schematic top view used for describing the expansion (1) of the graphic image serving as the drawing object.
Figure 12:
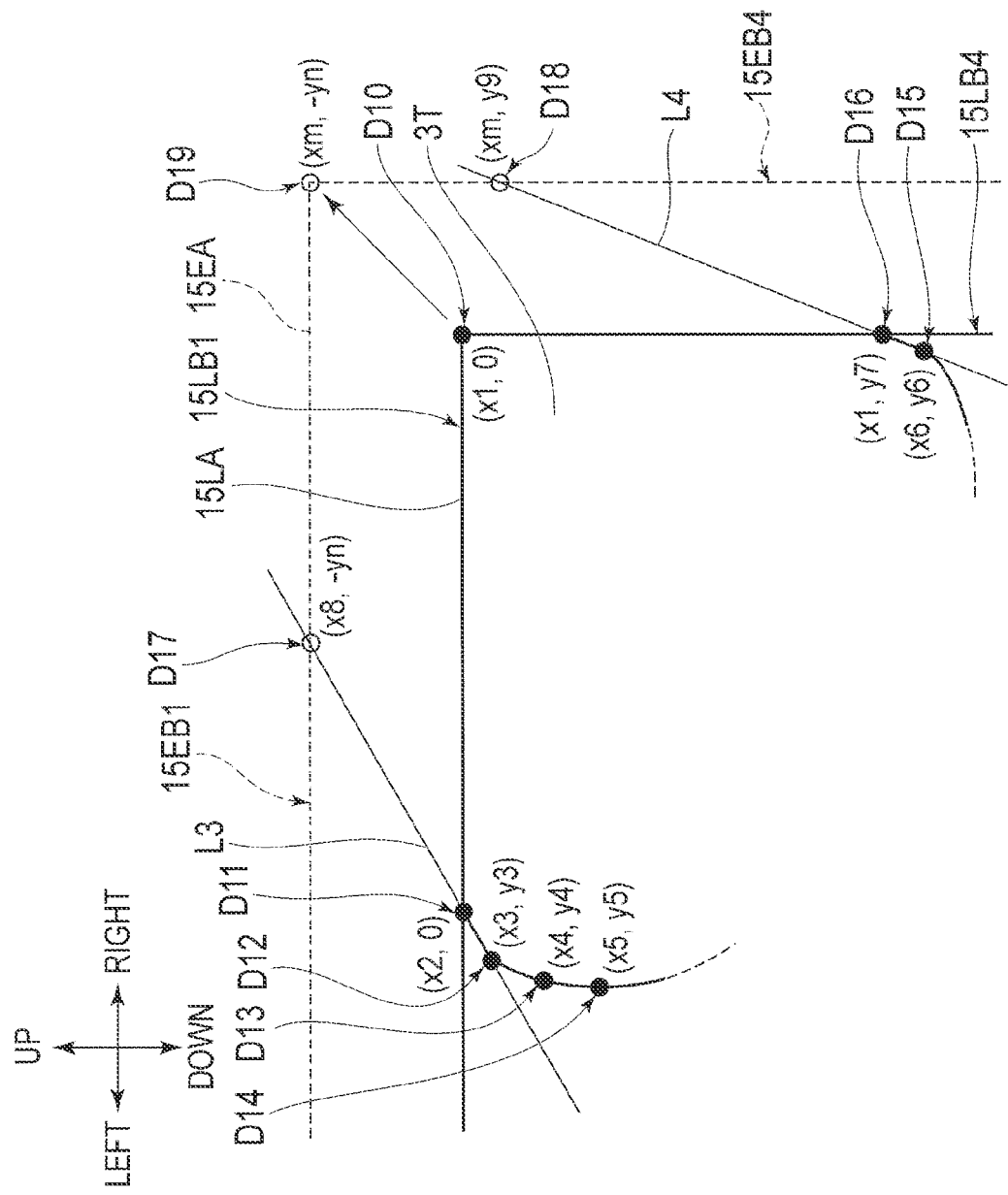
FIG. 12 is a schematic top view used for describing the expansion (2) of the graphic image serving as the drawing object.
Figure 13:
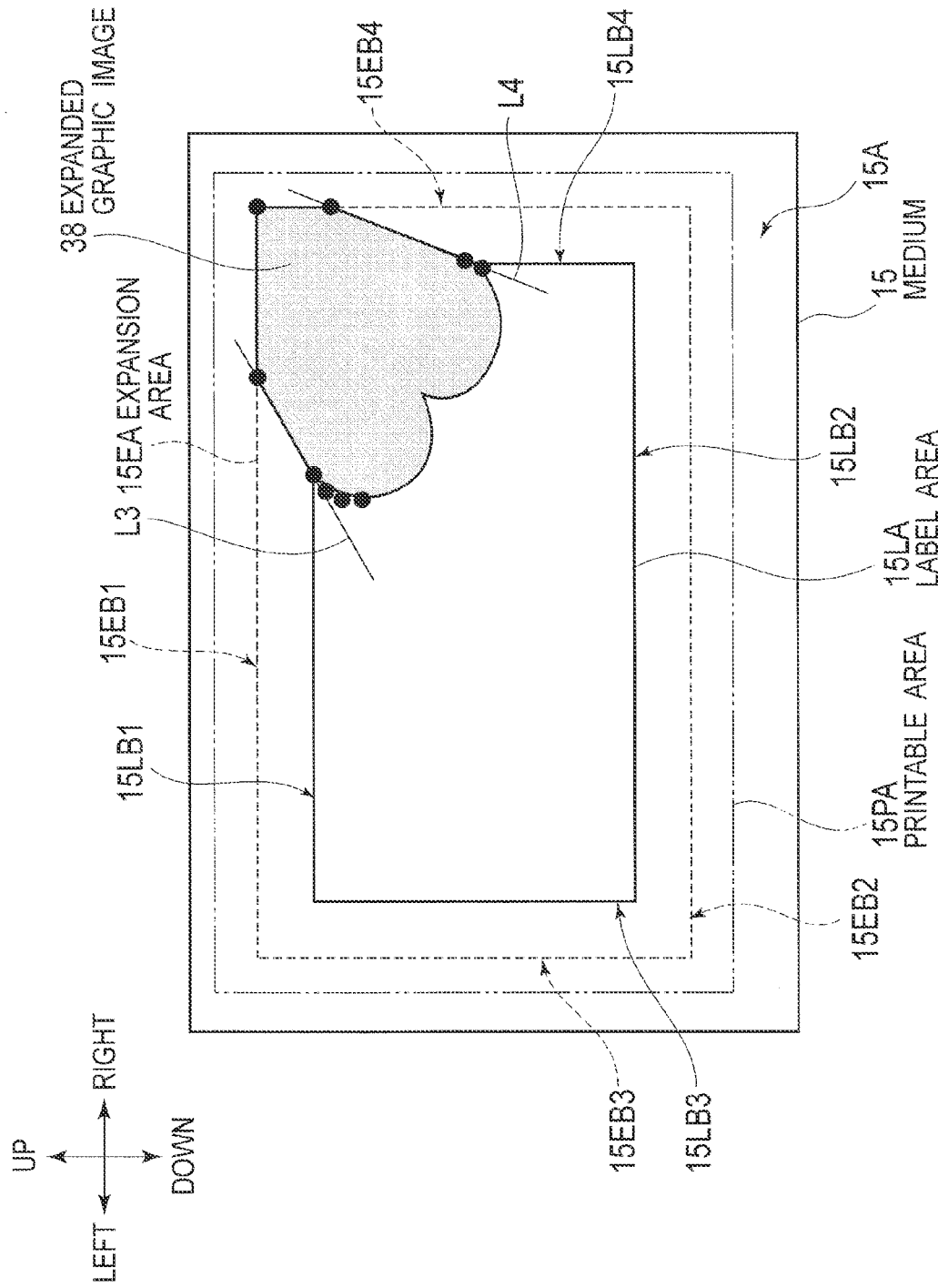
FIG. 13 is a schematic top view used for describing the expansion (3) of the graphic image serving as the drawing object.

In this process, as illustrated in FIG. 11 to FIG. 13, assume that the drawing position information indicates, for example, coordinates (x1, 0), (x2, 0), (x3, y3), (x4, y4), (x5, y5), (x6, y6), (x1, y7) of 10th dot position D10 to 16th dot position D16. In this case, the coordinates (x1, 0) of 10th dot position D10 are coordinates of an intersection between label-area right boundary line 15LB4 expressed by x=x1 and label-area upper boundary line 15LB1 expressed by y=0, i.e., the upper right corner of the label-area boundary line. Therefore, expansion processor 33 determines that the outline of graphic image 37 is in contact with the label-area boundary line at 10th dot position D10. Incidentally, FIG. 11 to FIG. 13 illustrate only 10th dot position D10 to 16th dot position D16 that are some of dot positions through which the outline of graphic image 37 runs, while not illustrating other dot positions.

Further, coordinates (x2, 0) of 11th dot position D11 is on label-area upper boundary line 15LB1 expressed by y=0, and therefore, expansion processor 33 determines that the outline of graphic image 37 is in contact with label-area upper boundary line 15LB1 at 11th dot position D11. Furthermore, coordinates (x1, y7) of 16th dot position D16 are on label-area right boundary line 15LB4 expressed by x=x1, and therefore, expansion processor 33 determines that the outline of graphic image 37 is in contact with label-area right boundary line 15LB4 at 16th dot position D16. In this example, the outline of graphic image 37 is in contact with the label-area boundary line, in a range from 11th dot position D11 to 16th dot position D16 via 10th dot position D10. In this case, expansion processor 33 identifies 11th dot position D11 and 16th dot position D16 that are both ends of a range (hereinafter may also be referred to as an outline contact range) in which this outline is in contact with the label-area boundary line, among 10th dot position D10 and 11th dot position D11 to 16th dot position D16.

Assume that the image size of the label image is set to expand at least in the two directions of the upward direction and the rightward direction as described above. In this case, expansion processor 33 determines third straight line L3, which passes through 11th dot position D11 that is one end of the outline contact range, and twelfth dot position D12 next to 11th dot position D11 at a position outside the outline contact range (i.e., inside the label-area boundary line), as in the above-described case of processing line image 35. Third straight line L3 is expressed by the following formula (3).

$$y = -a1x + b1 \qquad (3)$$

Expansion processor 33 thereby determines a position where the outline when graphic image 37 is expanded upward is in contact with expansion-area upper boundary line 15EB1 expressed by y=−yn, as coordinates (x8, −yn) of 17th dot position D17 that is an intersection between expansion-area upper boundary line 15EB1 and third straight line L3. Further, expansion processor 33 determines fourth straight line L4, which passes through 16th dot position D16 that is the other end of the outline contact range, and 15th dot position D15 next to 16th dot position D16 at a position outside the outline contact range (i.e., inside the label-area boundary line). Fourth straight line L4 is expressed by the following formula (4).

$$y = -a2x + b2 \qquad (4)$$

Expansion processor 33 thereby determines a position where the outline when graphic image 37 is expanded rightward is in contact with expansion-area right boundary line 15EB4 expressed by x=xm, as coordinates (xm, y9) of 18th dot position D18 that is an intersection between expansion-area right boundary line 15EB4 and fourth straight line L4. The outline contact range includes 10th dot position D10 that is the upper right corner of the label-area boundary line. Therefore, expansion processor 33 determines a position where the outline when graphic image 37 is expanded upward and rightward is in contact with the expansion-area boundary line, as coordinates (xm, −yn) of 19th dot position D19 that is an intersection (i.e., the upper right corner of the expansion-area boundary line) between expansion-area upper boundary line 15EB1 expressed by y=−yn and expansion-area right boundary line 15EB4 expressed by x=xm. In this way, expansion processor 33 determines the coordinates of each of 17th dot position D17 to 19th dot position D19 that become the position of a new end part of the outline when graphic image 37 is expanded. Expansion processor 33 then updates the drawing position information that indicates the drawing position of graphic image 37 in the drawing object data, by deleting the coordinates of 10th dot position D10 serving also as the position of the upper right corner of the label-area boundary line, and then adding the coordinates of each of 17th dot position D17 to 19th dot position D19 that become the position of the new end part of the outline when graphic image 37 is expanded. Expansion processor 33 can thereby generate expansion drawing position information indicating the drawing position of expanded graphic image 38 obtained by expanding graphic image 37, based on the drawing position information indicating the drawing position of graphic image 37.

The drawing position information indicating the drawing position of graphic image 37 is, actually, the information that also defines the shape and size of the outline of graphic image 37, by indicating the coordinates of each of 10th dot position D10 to 16th dot position D16 through which graphic image 37 runs in the drawing, as described above. Therefore, the expansion drawing position information indicating the drawing position of expanded graphic image 38 likewise defines the shape and size of expanded graphic image 38, by indicating the coordinates of each of 11th dot position D11 to 19th dot position D19 through which expanded graphic image 38 runs in the drawing. In addition, the drawing object data of the drawing object whose type is "graphic" stores the drawing format information, which indicates the type, thickness, and color of the outline, as well as whether to fill the inside of the outline, and fill use information when filling, of graphic image 37, as the drawing format of graphic image 37 serving as the drawing object. This drawing format information indicates in what drawing format graphic image 37 is to be drawn, irrespective of the shape and size of the outline (i.e., the drawing position of the outline) of graphic image 37, and thus is applicable as-is to the drawing of expanded graphic image 38 obtained by expanding graphic image 37. Therefore, expansion processor 33 can generate the expansion drawing object data indicating expanded graphic image 38, based on the drawing object data indicating graphic image 37, by updating the drawing position information in the drawing object data indicating graphic image 37 to the expansion drawing position information.

In this way, expansion processor 33 can generate expanded graphic image 38 obtained by expanding graphic image 37 targeted for expansion to extend from label area 15LA to the expansion-area boundary line of expansion area 15EA, and can also generate the expansion drawing object data indicating expanded graphic image 38. Even if, for example, the outline of a graphic image serving as the drawing object is in contact with only any one of label-area upper boundary line 15LB1, label-area lower boundary line 15LB2, label-area left boundary line 15LB3, and label-area right boundary line 15LB4, expansion processor 33 can generate expansion drawing object data together with an expanded graphic image obtained by expanding the graphic image, by executing an expansion processing similar to that described above. In addition, even if the drawing object targeted for expansion is a graphic image having an outline of any of various shapes such as a rectangle, a circle, and an oval, expansion processor 33 can generate expansion drawing object data together with an expanded graphic image by executing an expansion processing similar to that described above. Meanwhile, for example, if the outline of the graphic image serving as the drawing object is away from (i.e., not at all in contact at with) the label-area boundary line, expansion processor 33 does not expand the graphic image in particular.

As described above, according to the drawing position of the drawing object targeted for expansion in label area 15LA of medium 15, expansion processor 33 appropriately expands this drawing object so that the drawing object is out of label area 15LA toward the printable-area boundary line side. In other words, expansion processor 33 expands a part in contact with the label-area boundary line in a drawing object targeted for expansion, to extend this part to the printable-area boundary line side, and generates expansion drawing object data together with an expanded object. Expansion processor 33 then sends out the expansion drawing object data to expansion-print-data generator 40. In contrast, when a drawing object targeted for expansion is away from the label-area boundary line, expansion processor 33 does not expand this drawing object in particular. Therefore, in this case, expansion processor 33 directly sends out the drawing object data indicating the drawing object targeted for expansion, to expansion-print-data generator 40. Further, when the detection result information received together with the drawing object data from expansion-target detector 32 indicates that the drawing object is a non-target for expansion, expansion processor 33 directly sends out the drawing object data to expansion-print-data generator 40 without executing the expansion processing.

When, for example, the printer does not have the function of developing a drawing object into an image for printing, expansion-print-data generator 40 performs as follows. When receiving the drawing object data whose type is "character" from expansion processor 33, expansion-print-data generator 40 develops a character image serving as the drawing object on RAM 8, based on the drawing format information and the drawing position information stored in the drawing object data, and converts this character image into an image command. Further, when receiving the drawing object data whose type is "bitmap" from expansion processor 33, expansion-print-data generator 40 develops a bitmap image serving as the drawing object on RAM 8, based on the drawing format information and the drawing position information stored in the drawing object data, and converts this bitmap image into an image command. Furthermore, when receiving the expansion drawing object data whose type is "line" from expansion processor 33, expansion-print-data generator 40 develops expanded line image 36 illustrated in FIG. 9 and serving as the expanded drawing object on RAM 8, based on the drawing format information and the drawing position information stored in the expansion drawing object data, and converts expanded line image 36 into an image command.

Still furthermore, when receiving the expansion drawing object data whose type is "graphic" from expansion processor 33, expansion-print-data generator 40 develops an expanded graphic image serving as the expanded drawing object on RAM 8, based on the drawing format information and the expansion drawing position information stored in the expansion drawing object data, and converts this expanded graphic image into an image command. Meanwhile, when the drawing object whose type is "line" arrives as the drawing object data from expansion processor 33 without being expanded, expansion-print-data generator 40 develops a line image serving as the drawing object on RAM 8, based on the drawing format information and the drawing position information stored in the drawing object data, and converts this line image into an image command. Likewise, when the drawing object whose type is "graphic" arrives as the drawing object data from expansion processor 33 without being expanded, expansion-print-data generator 40 develops a graphic image serving as the drawing object on RAM 8, based on the drawing format information and the drawing position information stored in the drawing object data, and converts this graphic image into an image command.

Meanwhile, when the inside of the outline of the expanded graphic image (and the graphic image) is to be uniformly filled with a color, the expansion drawing object data (and the drawing object data) whose type is "graphic" stores the drawing format information indicating the color of the filling as the fill use information. Therefore, in this case, for example, while developing the expanded graphic image 38 illustrated in FIG. 13 on RAM 8, based on the expansion drawing object data, expansion-print-data generator 40 uniformly fills the inside of the outline of expanded graphic image 38 with the color indicated by the fill use information.

Figure 14:
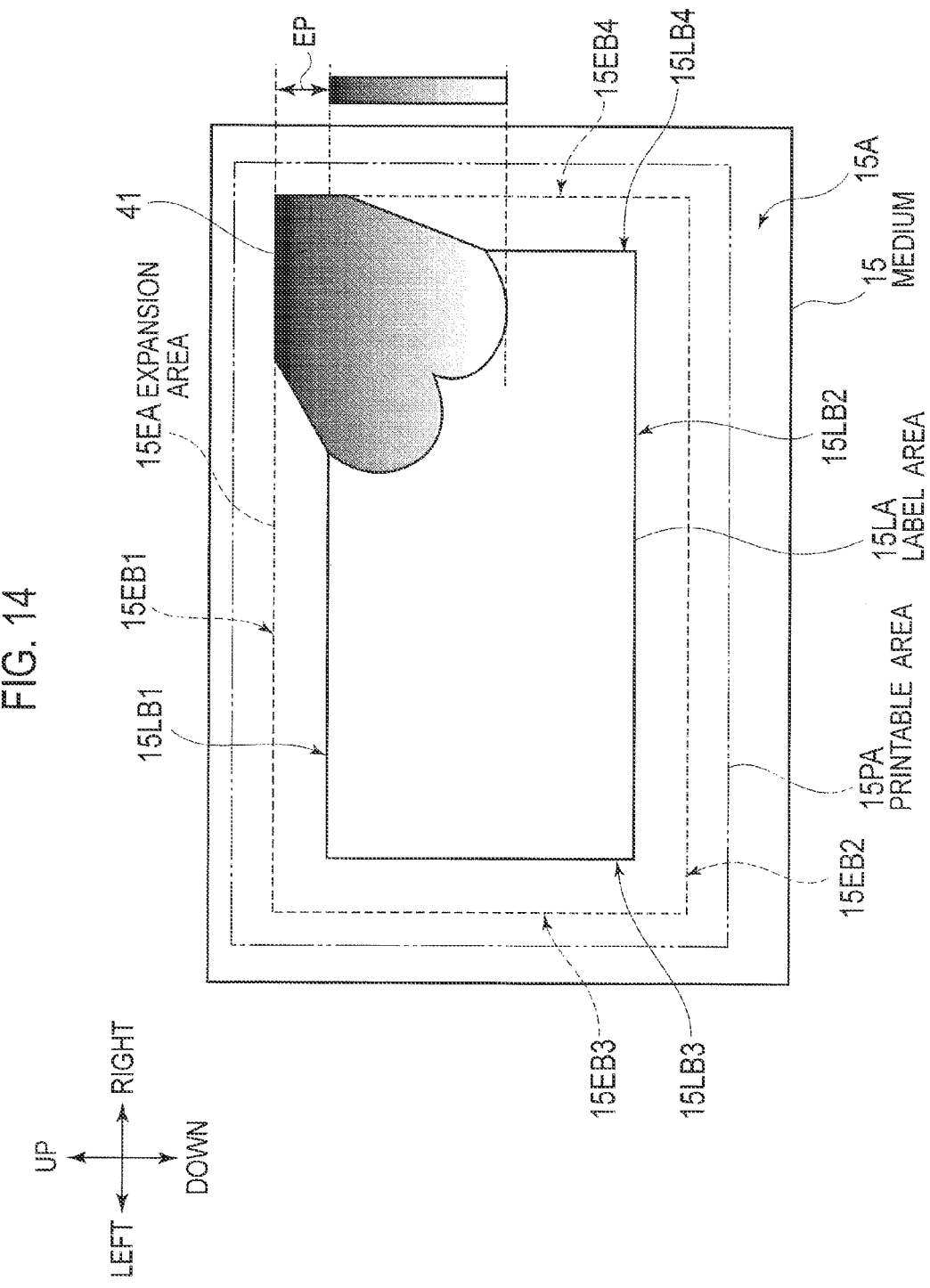
FIG. 14 is a schematic top view used for describing the filling of a graphic image serving as a drawing object, with gradation.

Further, when the inside of the outline of the expanded graphic image is to be filled with gradation, the drawing object data whose type is "graphic" stores the drawing format information that indicates a reference color in the filling as well as a width and a height of the gradation, as the fill use information. When the inside of the outline of the graphic image is to be filled with the gradation in the image's vertical direction (i.e., a longitudinal direction), the width and the height of the gradation are, for example, one dot and a maximum length dot in the image vertical direction in the outline, respectively. When the inside of the outline of the graphic image is to be filled with the gradation in the image's horizontal direction (i.e., a lateral direction), the width and the height of the gradation are, for example, a maximum length dot in the image horizontal direction in the outline and one dot, respectively. Assume that, as illustrated in FIG. 14, for example, expanded graphic image 41 is developed on RAM 8 based on the expansion drawing object data. In this case, if a fill is gradation in the longitudinal direction, then expansion-print-data generator 40 generates gradation data for gradation for the original graphic image (i.e., before expansion), based on the reference color as well as the width and the height of the gradation serving as the fill use information indicated by the drawing format information. Further, based on the drawing position information, and the reference color as well as the width and the height of the gradation serving as the fill use information indicated by the drawing format information, expansion-print-data generator 40 also generates gradation data for gradation for expansion part EP, which extends from the original graphic image, in expanded graphic image 41. Expansion-print-data generator 40 then fills the inside of the outline of expanded graphic image 41 by using these pieces of gradation data.

Figure 15:
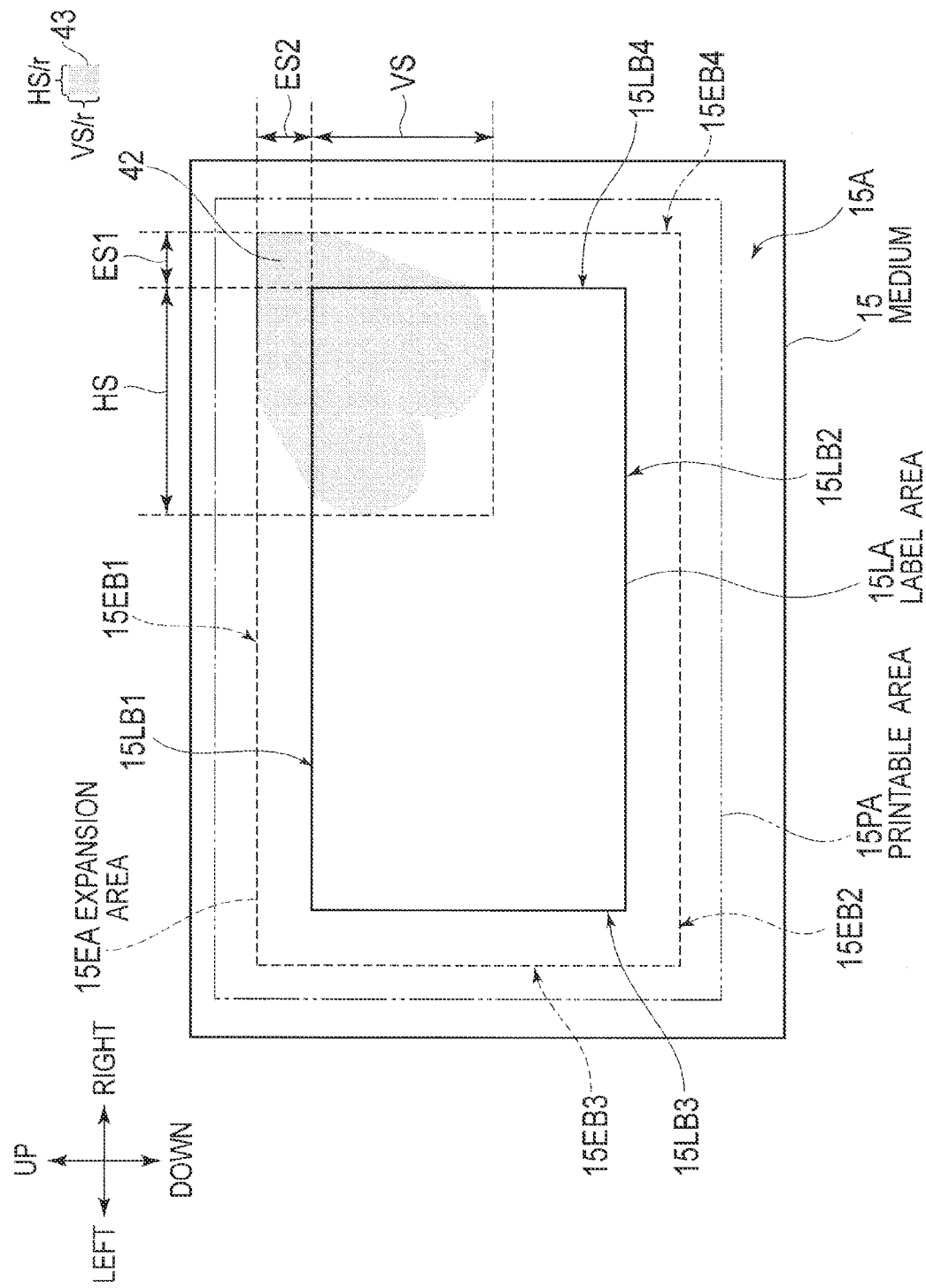
FIG. 15 is a schematic top view used for describing the filling of a graphic image serving as a drawing object, with a texture.

Furthermore, when the inside of the outline of the graphic image is to be filled with a texture, the drawing object data whose type is "graphic" stores the drawing format information that indicates texture image data of a texture image, as the fill use information. The texture image is set to have an image size equal to a fraction of the size of a rectangular image outline frame surrounding the outline of the graphic image. For example, assume that, as illustrated in FIG. 15, expanded graphic image 42 is developed on RAM 8, based on the expansion drawing object data including the texture image data as the fill use information. In this case, expansion-print-data generator 40 expands the image outline frame having a lateral-side length of HS and a vertical-side length of VS in the original graphic image, to an expanded outline frame surrounding expanded graphic image 42 and having a lateral-side length of HS+ES1 and a vertical-side length of VS+ES2. Expansion-print-data generator 40 then extends texture image 43 of an image size equal to a fraction of the size (i.e., 1/r) of the image outline frame, to an image having the size of the expanded outline frame, and fills the outline of expanded graphic image 42 by using this extended texture image 43.

In this way, expansion-print-data generator 40 converts each of the expanded drawing object and the drawing object not expanded (i.e., unexpanded) into an image command. Expansion-print-data generator 40 then generates expansion print data storing these image commands, and sends out the generated expansion print data to output unit 45. For example, when the printer has the function of developing a drawing object into an image for printing, expansion-print-data generator 40 converts each of the expansion drawing object data subjected to the expansion processing and the drawing object data not subjected to the expansion processing (i.e., not processed) into a PDL command. Expansion-print-data generator 40 then generates expansion print data storing these PDL commands, and sends out the generated expansion print data to output unit 45. Output unit 45 transmits the expansion print data received from expansion-print-data generator 40, to the printer via printer interface 13. Output unit 45 can thereby cause the printer to print the expanded label image of the expansion image size on surface 15A of medium 15, based on the expansion print data as described above.

When the label image is set to be printed on surface 15A of medium 15 in the reference image size, data-loading unit 30 sequentially loads the print data on a drawing object data basis, at the time of printing. In this case, data-loading unit 30 sends out the loaded drawing object data to expansion-print-data generator 40, without allowing type discrimination unit 31, expansion-target detector 32, and expansion processor 33 to perform any processing on this drawing object data, while this drawing object data sequentially passes through these units. Therefore, in this process, expansion-print-data generator 40 generates print data including image commands or PDL commands, based on the drawing object data received from expansion processor 33, and sends out the generated print data to output unit 45. Output unit 45 can thereby transmit the print data received from expansion-print-data generator 40 to the printer via printer interface 13, and then cause the printer to print the label image of the reference image size on surface 15A of medium 15, based on the print data. In this way, when the label image is set to be printed on surface 15A of medium 15 in the reference image size, data-loading unit 30, type discrimination unit 31, expansion-target detector 32, expansion processor 33, and output unit 45 can generate the print data for printing the label image of the reference image size, and transmit the generated print data to the printer. When the label image is set to be printed on surface 15A of medium 15 in the reference image size, data-loading unit 30 may also be, for example, configured to sequentially load the print data on a drawing object data basis, and directly send out the loaded drawing object data to expansion-print-data generator 40, to generate the print data.

(1-2) First Image Processing Procedure

Figure 16:
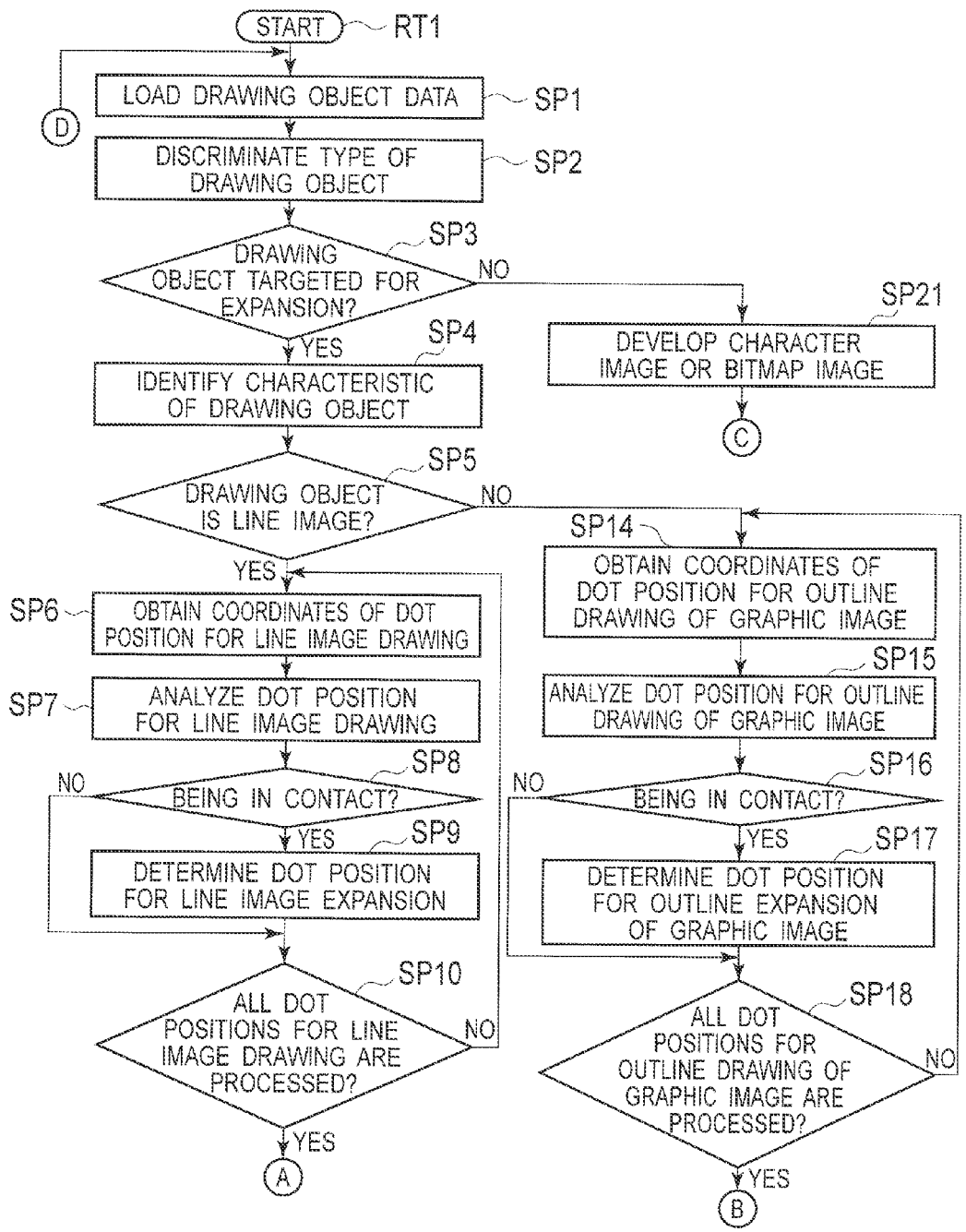
FIG. 16 is a flowchart illustrating a first image processing procedure (1).
Figure 17:
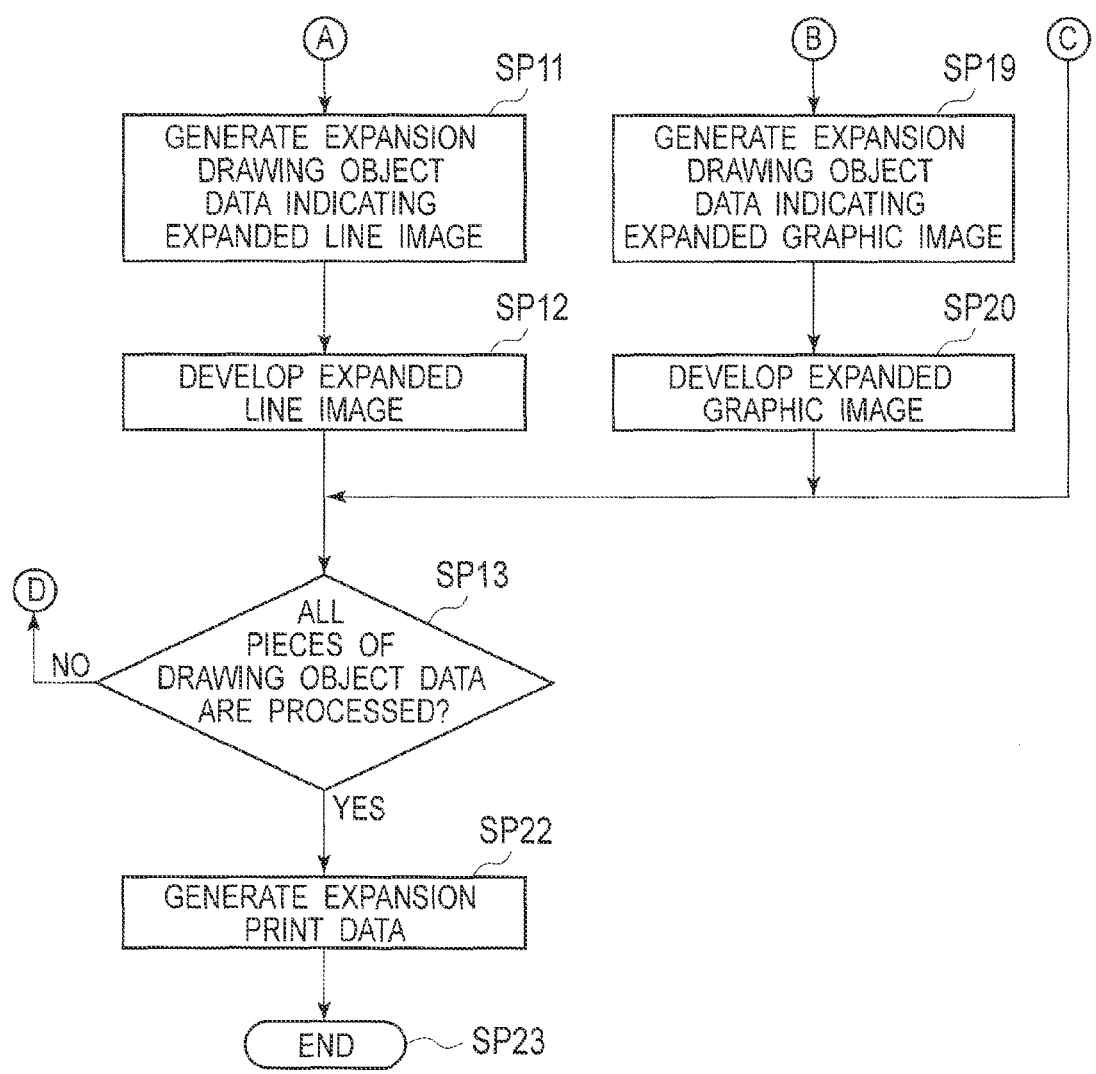
FIG. 17 is a flowchart illustrating the first image processing procedure (2).

Next, first image processing procedure RT1 executed by controller 5 according to the first image processing program is described using the flowchart illustrated in each of FIG. 16 and FIG. 17. Described below as an example is a case where, in a state in which first image processing procedure RT1 to be executed by controller 5 is set to print a label image on surface 15A of medium 15 in the expansion image size, every drawing object targeted for expansion is expanded, and an image is developed to generate expansion print data in the image processing apparatus 1. When an execution of printing of the label image is ordered by the user via operation unit 10, controller 5 starts first image processing procedure RT1 illustrated in FIG. 16 and FIG. 17, according to the first image processing program. Upon starting first image processing procedure RT1, controller 5 loads, in step SP1, one among one or more pieces of drawing object data stored in the print data, and then proceeds to next step SP2. In step SP2, controller 5 discriminates the type of the drawing object indicated by the drawing object data, and then proceeds to next step SP3. In step SP3, controller 5 determines whether the drawing objet is targeted for expansion, based on the discriminated type of the drawing object. When obtaining a positive result in this step SP3, because the type of the drawing object is "line" or "graphic", and the drawing object is targeted for expansion, controller 5 proceeds to next step SP4. In step SP4, controller 5 identifies a characteristic of the drawing object targeted for expansion, and then proceeds to next step SP5. In step SP5, controller 5 determines whether the drawing object targeted for expansion is a line image, based on the identified characteristic. When obtaining a positive result in this step SP5 because the drawing object targeted for expansion is a line image, controller 5 proceeds to next step SP6.

In step SP6, controller 5 extracts coordinates of one dot position among the coordinates of dot positions serving as drawing position information indicating a drawing position of the line image (i.e., for line image drawing), from the drawing object data, and then proceeds to next step SP7. In step SP7, controller 5 analyzes the dot position in label area 15LA, based on the coordinates of the dot position for the line image drawing, and coordinates of a label-area boundary line, and then proceeds to next step SP8. In step SP8, controller 5 determines whether the analyzed dot position for the line image drawing is in contact with the label-area boundary line. When obtaining a positive result in this step SP8 because the analyzed dot position for the line image drawing is in contact with the label-area boundary line, controller 5 proceeds to next step SP9. In step SP9, controller 5 extracts, from the drawing object data, one of the coordinates of other dot position next to the dot position of the coordinates extracted in step SP6 within label area 15LA, among the coordinates of the dot positions serving as the drawing position information. Next, based on the coordinates of each of the two dot positions next to each other, and an expansion quantity set for expansion of the label image, controller 5 determines a dot position (i.e., coordinates of a dot position for expansion on an expansion-area boundary line) for drawing by performing the expansion to extend the line image (i.e., for line image expansion). Controller 5 then proceeds to next step SP10.

When obtaining a negative result in step SP8 because the analyzed dot position for the line image drawing is away from the label-area boundary line, controller 5 proceeds to step SP10. In step SP10, controller 5 determines whether all the dot positions for the line image drawing are processed. When obtaining a negative result in step SP10, controller 5 returns to step SP6. Therefore, afterward, until obtaining a positive result in step SP10, controller 5 cyclically repeats execution of the processes from step SP6 to step SP10, and thereby determines the dot position for the line image expansion as appropriate. When obtaining a positive result in step SP10 by completing the processing for all the dot positions for the line image drawing, controller 5 proceeds to next step SP11. In step SP11, controller 5 generates expansion drawing object data indicating an expanded line image serving as an expanded object, by updating the drawing position information indicating the drawing position of the line image, by using the coordinates of the dot positions determined for the line image expansion. Controller 5 then proceeds to next step SP12. In step SP12, controller 5 develops the expanded line image serving as the expanded drawing object thereby converting the expanded line image into an image command, based on the expansion drawing object data, and then proceeds to next step SP13.

Meanwhile, when obtaining a positive result in step SP5 described above because the drawing object targeted for expansion is a graphic image, controller 5 proceeds to step SP14. In step SP14, controller 5 extracts the coordinates of one dot position among the coordinates of dot positions serving as drawing position information indicating a drawing position of the outline of the graphic image (i.e., for outline drawing), from the drawing object data, and then proceeds to next step SP15. In step SP15, based on the coordinates of the dot position for the outline drawing of the graphic image and the coordinates of a label-area boundary line, controller 5 analyzes the dot position in label area 15LA, and then proceeds to next step SP16. In step SP16, controller 5 determines whether the analyzed dot position for the outline drawing is in contact with the label-area boundary line. When obtaining a positive result in this step SP16 because the analyzed dot position for the outline drawing is in contact with the label-area boundary line, controller 5 proceeds to next step SP17. Assume that the analyzed dot position for the outline drawing is in contact with a point at an intermediate position of any of label-area upper boundary line 15LB1, label-area lower boundary line 15LB2, label-area left boundary line 15LB3, and label-area right boundary line 15LB4. In this case, in step SP17, controller 5 extracts the coordinates of one of the other dot position next to the dot position of the coordinates extracted from the drawing object data in step SP14 within label area 15LA, among the coordinates of the dot positions serving as the drawing position information. Next, based on the coordinates of each of the two dot positions next to each other, and an expansion quantity set for expansion of the label image, controller 5 determines a dot position (i.e., the coordinates of a dot position for expansion on an expansion-area boundary line) for expanding and drawing the graphic image (i.e., for outline expansion). Further, assume that the analyzed dot position for the outline drawing is in contact with any of the four corners of the upper, lower, left, and right corners of the label-area boundary line. In this case, based on the coordinates of the dot position, and the expansion quantity set for the expansion of the label image, controller 5 determines a corner of the expansion-area boundary line corresponding to any of the corners of the label-area boundary line in contact with this dot position, as a dot position for the outline expansion (i.e., coordinates of a dot position for expansion on the expansion-area boundary line). Upon thus determining the dot position for expanding and drawing the graphic image, controller 5 proceeds to next step SP18.

When obtaining a negative result in step SP16 because the analyzed dot position for the outline drawing is away from the label-area boundary line, controller 5 proceeds to step SP18. In step SP18, controller 5 determines whether all the dot positions for the outline drawing of the graphic image are processed. When obtaining a negative result in step SP18, controller 5 returns to step SP14. Afterward, until obtaining a positive result in step SP18, controller 5 cyclically repeats the execution of the processes from step SP14 to step SP18, and thereby determines the dot position for the outline drawing of the graphic image as appropriate. When obtaining a positive result in step SP18 by completing the processing for all the dot positions for the outline drawing of the graphic image, controller 5 proceeds to next step SP19. In step SP19, controller 5 generates expansion drawing object data indicating an expanded graphic image serving as an expanded object, by updating the drawing position information indicating the drawing position of the graphic image (i.e., the outline), by using the coordinates of the dot positions determined for the outline expansion of the graphic image. Controller 5 then proceeds to the next step SP20. In step SP20, controller 5 develops the expanded graphic image serving as the expanded drawing object thereby converting the expanded graphic image into an image command, based on the expansion drawing object data, and then proceeds to next step SP13.

Meanwhile, when obtaining a negative result in step SP3 described above because the type of the drawing object is "character" or "bitmap", and the drawing object is not targeted for expansion, controller 5 proceeds to step SP21. In step SP21, based on the drawing object data, controller 5 develops a character image or a bitmap image serving as the drawing object thereby converting this image into an image command. Controller 5 then proceeds to step SP13. In step SP13, controller 5 determines whether all pieces of the drawing object data (i.e., the drawing object data of all of one or more drawing objects forming the label image) stored in the print data are processed. When obtaining a negative result in this step SP13 because yet-to-be processed drawing object data is present in the drawing object data stored in the print data, controller 5 returns to step SP1. Afterward, until obtaining a positive result in step SP13, controller 5 cyclically repeats the execution of the processes from step SP1 to step SP21, thereby expanding the drawing object targeted for expansion. When obtaining a positive result in step SP13 by completing the processing for all pieces of the drawing object data stored in the print data, controller 5 proceeds to next step SP22. In step SP22, controller 5 generates expansion print data storing the one or more image commands generated for printing the label image, and transmits the generated expansion print data to the printer via printer interface 13. Controller 5 then proceeds to next step SP23, thereby ending first image processing procedure RT1.

(1-3) Operation and Effect of First Embodiment

In the above-described configuration, the first image processing is performed on the label image including two or more types of drawing objects for the borderless printing. In this process, even if expressed information, among pieces of drawing object data indicating the two or more types of drawing objects stored in the print data of the label image, is partially lost, image processing apparatus 1 detects only a specific type of drawing object data not affecting the expression of the information as an expansion target. Image processing apparatus 1 does not perform any expansion processing on the drawing object data other than the drawing object data targeted for expansion. In contrast, image processing apparatus 1 identifies the characteristic of the drawing object data targeted for expansion, and generates the expansion drawing object data of the expanded drawing object by performing the expansion processing according to the identified characteristic of the drawing object data. Image processing apparatus 1 then generates the expansion print data of the expanded label image, based on the expansion drawing object data and the unprocessed drawing object data on which no expansion processing is performed, and transmits the generated expansion print data to the printer. According to the above-described configuration, image processing apparatus 1 can cause the printer to print the unexpanded drawing object within label area 15LA, while printing the expanded drawing object on surface 15A of medium 15 as the expanded label image out of label area 15LA, based on the expansion print data. Image processing apparatus 1 can thereby cause the printer to perform the borderless printing of the label image, without losing important information expressed by the label image.

Meanwhile, as for the drawing object data not targeted for expansion among the one or more pieces of the drawing object data stored in the print data of the label image, image processing apparatus 1 uses this drawing object data as-is for generation of the expansion print data, without performing any expansion processing. Therefore, image processing apparatus 1 can cause the printer to print the expanded drawing object and the unexpanded drawing object on surface 15A of medium 15 as the expanded label image, in a state of maintaining most of a balance including a layout, a size, and the like of the two or more types of drawing objects of the original (i.e., pre-expanded) label image (i.e., without losing the balance). Therefore, even when printing the label image on surface 15A of medium 15 as the expanded label image, image processing apparatus 1 can deliver the information expressed by the original label image, as expressed by the original label image, to a viewer viewing the expanded label image as label 27.

In addition, image processing apparatus 1 generates the expansion drawing object data by performing the expansion processing on the drawing object data targeted for expansion, to extend a part in contact with the label-area boundary line from label area 15LA in the drawing object, and uses this expansion drawing object data for generation of the expansion print data. Therefore, image processing apparatus 1 can cause the printer to print the expanded drawing object serving as the expanded label image on surface 15A of medium 15, based on the expansion print data, without substantially changing the shape and the size relative to the original (i.e., pre-expanded) drawing object. Accordingly, image processing apparatus 1 can cause the printer to print the expanded drawing object serving as the expanded label image on surface 15A of medium 15, in a state where the balance including the layout, the size, and the like of the original drawing object in the original label image is more precisely maintained. Hence, even when printing the label image serving as the expanded label image on surface 15A of medium 15, image processing apparatus 1 can prevent an impression, when the expanded label image is viewed as label 27, from changing relative to an impression when the original label image is viewed.

(2) Second Embodiment (2-1) Circuit Configuration of Image Processing Apparatus

FIG. 18 illustrates image processing apparatus 50 according to a second embodiment, by providing parts corresponding to those in FIG. 1, with the same reference numerals as those in FIG. 1. Image processing apparatus 50 is configured in a manner similar to image processing apparatus 1 according to the first embodiment, except for the following. In image processing apparatus 50, controller 51 executes a second image processing different from the first image processing, for a label image, according to a second printer driver (hereinafter may also be referred to as a second image processing program). The second printer driver is created to be partially different from the first image processing program in terms of its description contents, and is stored in storage unit 52 beforehand. In this case, for example, controller 51 can generate label print data indicating label images for two or more pages according to an operation performed on operation unit 10 by a user, and store the generated label print data into storage unit 52. When, for example, the label images for multiple pages are selected as a printing target by the user via operation unit 10, controller 51 then reads the label print data indicating the selected label images for the multiple pages from storage unit 52, into RAM 8. Subsequently, when a printing of the label images is requested by the user via operation unit 10, controller 51 reads the pre-stored printing setting screen data from storage unit 52, and displays a printing setting screen (not illustrated) on display 12, in a manner similar to the above-described first embodiment. Assume that, in this state, medium 15 for label printing is selected by the user on the printing setting screen via operation unit 10. In response to this selection, controller 51 generates print data, which is similar to that of the above-described first embodiment, for the label image of each page, based on the label print data indicating the label images for the multiple pages.

In addition, for example, when the display of a borderless-printing setting screen is requested by the user via operation unit 10, controller 51 reads the pre-stored borderless-printing setting screen data from storage unit 52 and displays borderless-printing setting screen 17 on display 12, in a manner similar to the above-described first embodiment. Assume that an expansion quantity of a value greater than "0" is inputted into at least one of the first to fourth expansion quantity input sections 18 to 21 on borderless-printing setting screen 17 by the user, and then key 22 is selected and operated. Controller 51 then sets the expansion quantity inputted into at least one of the first to fourth expansion quantity input sections 18 to 21. In other words, controller 51 sets the label image for one page, among the label images for the multiple pages, to be printed on surface 15A of each of mediums 15, in the same expansion image size. Subsequently, assume that the execution of the printing of the label image (i.e., consecutive printing of the label images for the multiple pages) is ordered on the printing setting screen by the user via operation unit 10. Controller 51 then sequentially executes the second image processing on the label images for the multiple pages, and generates expansion print data for each expanded label image for one page. Each time the expansion print data is generated indicating the expanded label image for one page, controller 51 transmits the generated expansion print data to the printer via printer interface 13. Controller 51 can thereby cause the printer to print sequentially the label image for one page on surface 15A of each of mediums 15, in the same expansion image size, based on the pieces of expansion print data.

Meanwhile, the label images for the multiple pages may be generated, for example, to express different kinds of information, by being varied in terms of drawing contents, quantity, layout, and the like of the drawing objects, to be provided as labels to be affixed to different products and the like. However, the label images for the multiple pages may also be generated, for example, to express basically the same information, by having a part being slightly varied in terms of drawing contents, layout, and the like of the drawing objects, in a conceptual phase for labels to be affixed to one kind of product. Therefore, in the consecutive printing, when executing the second image processing for the label image of the first page, controller 51 detects one or more pieces of drawing object data, which is stored in the print data of this label image and indicates the drawing object whose type is "character" or "bitmap", as a non-target for expansion. Controller 51 then performs an expansion processing, as with the above-described first embodiment.

However, as for one or more pieces of drawing object data, which is stored in the print data of the label image and indicates the drawing object whose type is "line" or "graphic", controller 51 detects this type of drawing object data as a target for expansion, as with the above-described first embodiment. Controller 51 then extracts drawing format information and drawing position information from this drawing object data, as the original image information. Controller 51 then performs, as with the above-described first embodiment, the expansion processing on the one or more pieces of the drawing object data indicating the drawing object targeted for expansion, and generates expansion drawing object data as appropriate. When thus generating the expansion drawing object data, controller 51 extracts drawing format information and expansion drawing position information from the expansion drawing object data, as expansion drawing information. Controller 51 then determines expansion information, by associating type information, the original image information, and the expansion drawing information corresponding to an expanded drawing object with each other. Controller 51 then stores the expansion information into storage unit 52, by transmitting the expansion information thereto. Therefore, for example, when generating pieces of expansion drawing object data based on the print data of the label image of the first page, controller 51 stores pieces of expansion information for pieces of drawing object data into storage unit 52, as expansion information list 53, by applying individually identifiable identification information thereto, as illustrated in FIG. 19.

Further, when executing the second image processing for the label image of the second page, controller 51 reads expansion information list 53 from storage unit 52. Subsequently, based on the type information and the original image information (i.e., the drawing format information and the drawing position information) in all the pieces of the drawing object data stored in the print data of the label image, and the type information and the original image information serving as the expansion information in expansion information list 53, controller 51 makes a determination. Specifically, controller 51 determines whether the expansion drawing information in expansion information list 53 can be used for (i.e., be applied to) the expansion processing for these pieces of the drawing object data. As for the one or more pieces of the drawing object data indicating the drawing object whose type is "character" or "bitmap" among all the pieces of the drawing object data stored in the print data, type information matching with the type information in the drawing object data is not present in expansion information list 53. Therefore, in this case, controller 51 determines that the expansion drawing information in expansion information list 53 is not to be used. As for the one or more pieces of the drawing object data indicating the drawing object whose type is "character" or "bitmap", controller 51 also detects this type of drawing object data as a non-target for expansion. Therefore, controller 51 does not perform the expansion processing, as with the above-described first embodiment.

In contrast, as for the one or more pieces of the drawing object data indicating the drawing object whose type is "line" or "graphic", type information and original image information matching with the type information and the original image information in the drawing object data may be present in expansion information list 53. In this case, controller 51 determines that the expansion drawing information, which corresponds to the matching type information and original image information, in expansion information list 53, is to be used for the expansion processing. However, as for the one or more pieces of the drawing object data indicating the drawing object whose type is "line" or "graphic", type information and original image information matching with the type information and the original image information in the drawing object data may be absent in expansion information list 53. In this case, controller 51 determines that the expansion drawing information in expansion information list 53 is not to be used for the expansion processing.

Further, assume that, for the drawing object data indicating the drawing object whose type is "line" or "graphic", controller 51 determines that the expansion drawing information is to be used for the expansion processing, and detects the drawing object data as a target for expansion. In this case, controller 51 generates expansion drawing object data by performing the expansion processing by using the expansion drawing information (i.e., expansion drawing position information). Furthermore, assume that for the drawing object data indicating the drawing object whose type is "line" or "graphic", controller 51 determines that the expansion drawing information is not to be used for the expansion processing, and detects the drawing object data as a target for expansion. In this case, controller 51 generates expansion drawing object data as appropriate, by performing the expansion processing as with the above-described first embodiment. In the second image processing for the label image of the second page, controller 51 performs as follows. Assume that, for the drawing object data indicating the drawing object whose type is "line" or "graphic", controller 51 generates expansion drawing object data by performing the expansion processing without using the expansion drawing information. Controller 51 then stores expansion information corresponding to the expanded drawing object into storage unit 52 as with the execution of the second image processing on the label image of the first page, thereby updating expansion information list 53. Further, for the label image of each of the third and subsequent pages, controller 51 executes the second image processing in a manner similar to that for the label image of the second page. In this way, based on the print data of the label images for the multiple pages, controller 51 can generate the expansion print data for the expanded label images for the multiple pages by making the second image processing as simple as possible in the consecutive printing.

Meanwhile, after completion of such consecutive printing of the label images for the multiple pages, if, for example, operation unit 10 is operated by the user to delete a list in an arbitrary timing, controller 51 deletes expansion information list 53 from storage unit 52 in response to this operation. Assume that, in a state where expansion information list 53 is not stored in storage unit 52, controller 51 performs the consecutive printing of the label images for the multiple pages again. In this case, controller 51 stores the expansion information as expansion information list 53 into storage unit 52 in a manner similar to that described above, and then uses the expansion information for the second image processing as appropriate. Further, when performing the consecutive printing of the label images for the multiple pages again in a state where expansion information list 53 is stored in storage unit 52, controller 51 can use the expansion information list 53 stored in storage unit 52 for the second image processing, by appropriately updating expansion information list 53. Furthermore, for example, when singly printing the label image for one page, in a state where expansion information list 53 is stored in storage unit 52, controller 51 can also use expansion information list 53 stored in storage unit 52 for the second image processing, by appropriately updating expansion information list 53. Specifically assume, for example, that after performing the consecutive printing of the label images for the multiple pages, the drawing contents, layout, and the like of the drawing object are revised in the label image for at least one page among the label images for the multiple pages, and the revised label image is singly printed. Controller 51 can then use, for the second image processing, expansion information list 53 stored in storage unit 52 in the previous consecutive printing, while appropriately updating expansion information list 53. Therefore, even when singly printing the label image, controller 51 can generate the expansion print data for the expanded label image, based on the print data of a page image, by making the second image processing as simple as possible.

Here, as described above, controller 51 executes the second image processing according to the second image processing program. In the following description to be provided with reference to FIG. 20, parts corresponding to those in FIG. 7 are provided with the same reference numerals as those in FIG. 7. Various functions implemented by controller 51 according to the second image processing program are illustrated as functional circuit blocks for convenience. Further, various kinds of processing, which are executed by controller 51 as the second image processing according to the second image processing program, in a state where the label image is set to be printed on surface 15A of medium 15 in the expansion image size, are specifically described as processes executed by these functional circuit blocks. The processes executed by the functional circuit blocks are described by taking one case as an example. In this case, when the second image processing for the label image of the first page begins, expansion information list 53 is not stored in storage unit 52, and instead, expansion information list 53 is stored into storage unit 52 while the second image processing for the label image of the first page is executed. Further, when the second image processing for the label image of the second page begins, expansion information list 53 is read from storage unit 52 into RAM 8 (not illustrated in FIG. 20). For example, in the consecutive printing, controller 51 reads the label print data of the label images for the multiple pages from storage unit 52 into RAM 8 according to an operating system. Controller 51 then generates the print data for the label image of each page, based on the label print data in RAM 8, according to the selection of medium 15 for the label printing by the user. In addition, for example, controller 51 reads expansion information list 53 from storage unit 52 into RAM 8, according to the operating system.

Figure 20:
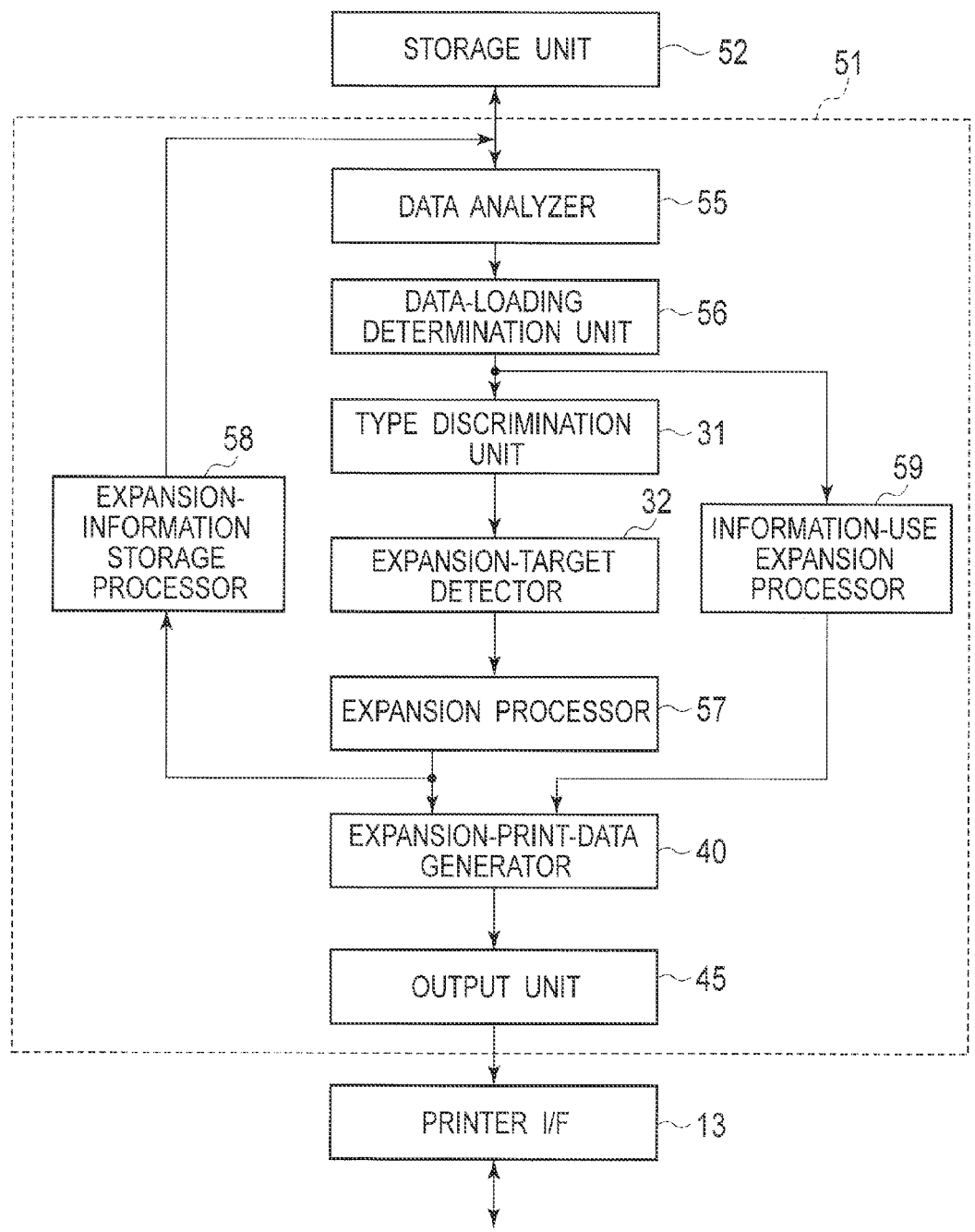
FIG. 20 is a block diagram illustrating functional circuit blocks used for describing a second image processing executed by a controller.

Therefore, as illustrated in FIG. 20, upon a start of the second image processing for the label image of the first page in the consecutive printing, data analyzer 55 detects whether expansion information list 53 is read from storage unit 52 into RAM 8 (not illustrated). When detecting that expansion information list 53 is not being read from storage unit 52 into RAM 8, data analyzer 55 notifies data-loading determination unit 56 of this result. Further, upon a start of the second image processing for the label image of the second page, data analyzer 55 likewise detects whether expansion information list 53 is read from storage unit 52 into RAM 8. When detecting that expansion information list 53 is being read from storage unit 52 into RAM 8, data analyzer 55 performs a comparison between this drawing object data and expansion information list 53, by sequentially using the one or more pieces of the drawing object data stored in the print data of the label image for the second page. Specifically, data analyzer 55 compares the type information and the original image information in this drawing object data, with the type information and the original image information serving as the expansion information in expansion information list 53. Assume that the type information and the original image information matching with the type information and the original image information in the drawing object data are absent in expansion information list 53. In this case, as a result of the analysis, data analyzer 55 determines that, for this drawing object data, the expansion drawing information usable for the expansion processing is not present. Data analyzer 55 then, for example, adds un-usability information, which indicates that the expansion drawing information is not to be used for the expansion processing, to the drawing object data on RAM 8.

In contrast, assume that type information and original image information matching with the type information and the original image information in the drawing object data are present in expansion information list 53. In this case, as a result of the analysis, data analyzer 55 determines that, for this drawing object data, the expansion drawing information usable for the expansion processing is present. Data analyzer 55 then, for example, adds identification information, which corresponds to the matching type information and the original image information in expansion information list 53, to the drawing object data on RAM 8. Therefore, the identification information added to the drawing object data by data analyzer makes it possible to identify the expansion drawing information to be used for the expansion processing of the drawing object data, as the expansion drawing information corresponding to the matching type information and the original image information in expansion information list 53. Subsequently, upon completion of the analysis of these one or more pieces of the drawing object data, data analyzer 55 notifies data-loading determination unit 56 of the fact that expansion information list 53 is read from storage unit 52 into RAM 8. Further, upon a start of the second image processing for the label image for each of the third and subsequent pages, data analyzer 55 executes processes similar to those executed upon the start of the second image processing for the label image of the second page.

Assume that, when the second image processing is executed for the label image of the first page, data analyzer 55 notifies data-loading determination unit 56 of the fact that expansion information list 53 is not read into RAM 8. In this case, in response to this notification, data-loading determination unit 56 sequentially reads the one or more pieces of the drawing object data stored in the print data of this label image from RAM 8, in a manner similar to data-loading unit 30 according to the above-described first embodiment. Further, each time upon reading the drawing object data from RAM 8, data-loading determination unit 56 determines not to use the expansion drawing information for the expansion processing of this drawing object data, in response to a notification from data analyzer 55 in this reading. Data-loading determination unit 56 then sends out the drawing object data to type discrimination unit 31, according to a result of this determination. Therefore, each time the drawing object data arrives from data-loading determination unit 56, type discrimination unit 31 discriminates the type of the drawing object, and sends out the drawing object data to expansion-target detector 32, together with the type discrimination information. Further, each time the drawing object data arrives together with the type discrimination information from type discrimination unit 31, expansion-target detector 32 detects whether the drawing object is targeted for expansion, and sends out the drawing object data to expansion processor 57, together with detection result information.

Each time the drawing object data arrives together with the detection result information from expansion-target detector 32, expansion processor 57 determines whether the drawing object is targeted for expansion, based on the detection result information. When the drawing object is targeted for expansion, expansion processor 57 extracts the type information and the original image information (i.e., the drawing format information and the drawing position information) from the drawing object data. Expansion processor 57 then identifies the type of the drawing object as a characteristic as with expansion processor 33 according to the above-described first embodiment, and appropriately generates expansion drawing object data, by performing the expansion processing corresponding to this identified characteristic, on the drawing object data. When generating the expansion drawing object data, expansion processor 57 extracts the expansion image information (i.e., the drawing format information and the expansion drawing position information) from the expansion drawing object data. Expansion processor 57 then sends out, as the expansion information, the expansion image information, together with the type information and the original image information extracted from the drawing object data before the expansion processing, to expansion-information storage processor 58. Further, expansion processor 57 sends out the expansion drawing object data to expansion-print-data generator 40.

Therefore, when being provided with the expansion information from expansion processor 57, expansion-information storage processor 58 stores this expansion information into storage unit 52, by sending out this expansion information thereto. Meanwhile, as with expansion processor 33 according to the above-described first embodiment, expansion processor 57 does not expand the drawing object targeted for expansion when the drawing object is away from the label-area boundary line. In this case, expansion processor sends out the drawing object data as-is to expansion-print-data generator 40, without sending out the expansion information to expansion-information storage processor 58. In addition, when the drawing object is not targeted for expansion, expansion processor 57 does not extract the type information and the original image information from the drawing object data. Therefore, in this case, expansion processor 57 directly sends out the drawing object data as-is to expansion-print-data generator 40, without sending out the expansion information to expansion-information storage processor 58.

Meanwhile, assume that, when the second image processing is executed for the label image of the second page, data analyzer 55 notifies data-loading determination unit 56 of the fact that expansion information list 53 is read into RAM 8. In this case, in response to this notification, data-loading determination unit 56 sequentially reads out the one or more pieces of the drawing object data stored in the print data of the label image from RAM 8, in a manner similar to that described above. Data-loading determination unit 56 also determines whether the expansion drawing information is to be used for the expansion processing of the drawing object data. In other words, when the un-usability information is added to the drawing object data, data-loading determination unit 56 determines not to use the expansion drawing information for the expansion processing, and sends out the drawing object data to type discrimination unit 31. Type discrimination unit 31, expansion-target detector 32, expansion processor 57, and expansion-information storage processor 58 in the subsequent stages of data-loading determination unit 56 can each thereby execute a process similar to that when the second image processing is executed for the label image of the first page.

In contrast, when the identification information is added to the drawing object data, data-loading determination unit 56 determines to use the expansion drawing information for the expansion processing, and sends out the drawing object data to information-use expansion processor 59. When being provided with the drawing object data from data-loading determination unit 56, information-use expansion processor 59 reads the expansion drawing information identified by the identification information in expansion information list 53 from RAM 8, based on the identification information added to the drawing object data. Further, information-use expansion processor 59 updates the drawing position information in the drawing object data to the expansion drawing position information serving as the expansion drawing information (or updates the original image information to the expansion drawing information). Information-use expansion processor 59 thereby generates expansion drawing object data indicating the expanded drawing object, based on the drawing object data. Information-use expansion processor 59 then sends out this expansion drawing object data to expansion-print-data generator 40.

Meanwhile, when executing the second image processing for the label image of each of the third and subsequent pages, data analyzer 55, data-loading determination unit 56, type discrimination unit 31, expansion-target detector 32, expansion processor 57, expansion-information storage processor 58, and information-use expansion processor 59 each executes a process similar to that when the second image processing is executed for the label image of the second page. In the second embodiment, data analyzer 55 analyzes each of the one or more pieces of the drawing object data stored in the print data. Further, while sequentially reading the one or more pieces of the drawing object data stored in the print data from RAM 8, data-loading determination unit 56 determines whether the expansion drawing information is to be used for the expansion processing of the drawing object data, according to the result of the analysis by data analyzer 55. However, in the second embodiment, for example, the function of data analyzer 55 may be integrated into the function of data-loading determination unit 56. In this case, data-loading determination unit 56 may be configured to determine whether to use the expansion drawing information for the expansion processing of the drawing object data, by performing analysis while sequentially reading the one or more pieces of the drawing object data stored in the print data from RAM 8. In other words, in the second embodiment, it is possible to create the second image processing program to be implemented by integrating the function of data analyzer 55 into the function of data-loading determination unit 56.

(2-2) Second Image Processing Procedure

Next, second image processing procedure RT2 executed by controller 51 according to the second image processing program is described, using the flowchart illustrated in FIG. 21. In FIG. 21, parts corresponding to those in FIG. 16 and FIG. 17 are provided with the same reference numerals as those in FIG. 16 and FIG. 17. Described below as an example is a case where second image processing procedure RT2, which is to be executed by controller 51 regardless of the consecutive printing or the single printing, is set to print the label image on surface 15A of medium 15, in the expansion image size. Further, in this state, every drawing object targeted for expansion is expanded, and an image is developed to generate the expansion print data in the image processing apparatus 1. When execution of a printing of the label image is ordered by the user via operation unit 10, controller 51 starts second image processing procedure RT2 illustrated in FIG. 21, according to the second image processing program. Upon starting second image processing procedure RT2, controller 51 determines whether expansion information list 53 (i.e., the expansion information) is stored in storage unit 52, in step SP31. When obtaining a positive result in this step SP31 because storing expansion information list 53 is stored in storage unit 52, controller 51 reads expansion information list 53 from storage unit 52, and then proceeds to next step SP32. In step SP32, controller 51 analyzes whether the expansion information can be used for the expansion processing of each of the one or more pieces of the drawing data stored in the print data, thereby adding the un-usability information or the identification information indicating an analysis result to the drawing object data, and then proceeds to next step SP1. When obtaining a negative result in step SP31 because expansion information list 53 is not stored in storage unit 52, controller 51 proceeds to step SP1, without executing the process in step SP32. In step SP1, controller 51 loads one among the one or more pieces of the drawing object data stored in the print data, and then proceeds to next step SP33.

In step SP33, controller 51 determines whether to use the expansion drawing information for the expansion processing of the drawing object data. In step SP33, controller 51 determines not to use the expansion drawing information for the expansion processing because expansion information list 53 is not stored in storage unit 52, or determines not to use the expansion drawing information for the expansion processing because the un-usability information is added to the drawing object data. In either case, controller 51 obtains a negative result, and proceeds to next step SP34. In step SP34, controller 51 executes processes that are basically similar to the processes from step SP2 to step SP11, or the processes from step SP14 to step SP19, of first image processing procedure RT1 described above. However, when the drawing object is targeted for expansion, controller 51 executes the expansion processing after extracting the type information and the original image information from the drawing object data and, as a result, generates expansion drawing object data. Controller 51 then extracts the expansion drawing information from the expansion drawing object data, and then proceeds to next step SP35. In step SP35, when the type information and the original image information are extracted from the drawing object data, and the expansion drawing information is extracted from the expansion drawing object data in the process of step SP34, controller 51 stores these pieces of information into storage unit 52 as the expansion information, and then proceeds to next step SP36. Alternatively, in step SP35, when no expansion drawing object data is generated regardless of whether the type information and the original image information are extracted from the drawing object data in the process of step SP34, controller 51 proceeds to next step SP36, without performing any process for storing the expansion information into storage unit 52. In step SP36, controller 51 executes a process similar to the process of any of step SP12, step SP20, and step SP21 of first image processing procedure RT1 described above, and then proceeds to next step SP13.

Controller 51 obtains a positive result in step SP33, when determining to use the expansion drawing information for the expansion processing, because the expansion information list is stored in storage unit 52, and the identification information is added to the drawing object data. In this case, controller 51 proceeds to step SP37. In step SP37, based on the identification information added to the drawing object data, controller 51 extracts the corresponding expansion drawing information from expansion information list 53. Controller 51 then generates expansion drawing object data by updating the drawing position information in the drawing object data to the expansion drawing position information (or by updating the original image information to the expansion drawing information), and then proceeds to step SP36. In step SP36, controller 51 executes a process similar to either one of step SP12 and step SP20 of first image processing procedure RT1 described above, and then proceeds to next step SP13. When obtaining a negative result in step SP13, controller 51 returns to step SP1. Afterward, until obtaining a positive result in step SP13, controller 51 cyclically repeats an execution of the processes of step SP1, step SP33, step SP34, step SP35, step SP36, step SP37, and step SP13, thereby appropriately expanding the drawing object targeted for expansion. On the other hand, when obtaining a positive result in step SP13, controller 51 executes a process of next step SP22, and then proceeds to step SP38 thereby ending second image processing procedure RT2.

(2-3) Operation and Effect of Second Embodiment

In the above-described configuration, in a case where the second image processing is performed on the label image including the two or more types of drawing objects for the borderless printing, image processing apparatus 50 performs the expansion processing on the drawing object data targeted for expansion, and thereby generates the expansion drawing object data of the expanded drawing object. Image processing apparatus 50 then stores the expansion information (i.e., the expansion drawing information) for expanding the original drawing object to obtain an expanded drawing object, into storage unit 52. Assume that the second image processing is successively performed on the label image including the two or more types of drawing objects for the borderless printing. In this case, if the expansion information usable for the expansion processing of the drawing object data targeted for expansion is stored in storage unit 52, image processing apparatus 50 performs the expansion processing on the drawing object data targeted for expansion by using the expansion information, and thereby generates the expansion drawing object data. According to the above-described configuration, when performing the second image processing on the label image for the borderless printing, image processing apparatus 50 generates the expansion drawing object data by performing the expansion processing by appropriately using the expansion information of the drawing object data subjected to the expansion processing in the past. Image processing apparatus 50 can thereby greatly reduce the processing load of the expansion processing, and can greatly reduce the processing time of the expansion processing. Therefore, besides obtaining an effect similar to the effect obtained by the above-described first embodiment, image processing apparatus 50 can greatly reduce the time from the start of performing the second image processing for the borderless printing on the label image to the transmission of the expansion print data to the printer, as compared with the first embodiment.

(3) Other Embodiments (3-1) Other Embodiment 1

The first and second embodiments are described above, by using the case where, for the borderless printing of the label image on label area 15LA of medium 15 for the label printing, the expansion processing is performed to print the drawing object targeted for expansion, among the one or more drawing objects included in this label image, so that this drawing object extends from label area 15LA of medium 15. However, the invention is not limited to this case. For the borderless printing of a print image on the surface of any of various mediums such as paper and OHP sheet, the expansion processing may be performed to print a drawing object targeted for expansion, among one or more drawing objects included in this label image, so that this drawing object extends from the edge of the medium. According to this configuration, it is possible to perform the borderless printing of the print image, not only on medium 15 for the label printing, but on the medium with the entire surface serving as a printing area, as with the first and second embodiments described above. Therefore, in the case of performing the borderless printing of the print image on the surface of this type of medium, effects similar to the effects obtained by the first and second embodiments described above can also be obtained.

(3-2) Other Embodiment 2

Further, the first and second embodiments are described above, by using the case where, among the one or more drawing objects included in the label image, the drawing object targeted for expansion is detected depending on the type of the drawing object. However, the invention is not limited to this case. For example, regardless of the type of the one or more drawing objects included in the label image, a drawing object may be arbitrarily selected as an expansion target in generating the label image, and expansion-target detection information indicating whether the drawing object data is targeted for expansion may be stored in the drawing object. In this case, among the one or more drawing objects included in the label image, the drawing object targeted for expansion is detected based on the expansion-target detection information stored in the drawing object. According to this configuration, for example, even if the drawing object is of the type that is either "character" or "bitmap", it is possible to expand, for the borderless printing, the drawing object determined to be an expandable drawing object on a side that creates the label image. Further, according to this configuration, for example, even if the drawing object is of the type that is either "line" or "graphic", it is also possible to avoid expanding the drawing object when it is determined to be a non-expandable drawing object on the side that creates the label image. Therefore, according to this configuration, when performing the borderless printing of the label image, it is possible to expand the label image in a state close to an intention of the one who creates the label image. Meanwhile, in the invention, this configuration can be combined with the configuration of performing the borderless printing of the print image on the surface of any of the various mediums described in the other embodiment 1.

(3-3) Other Embodiment 3

Furthermore, the first and second embodiments are described above by using the case where, in the expansion of the label image for the borderless printing, the expansion quantity of the image size of the label image is individually inputted on borderless-printing setting screen 17, for the four directions of the image upward direction, the image downward direction, the image leftward direction, and the image rightward direction. In this case, the image size is set to expand according to the expansion quantity. However, the invention is not limited to this case. For example, in the expansion of the label image for the borderless printing, one expansion quantity may be inputted for the image size of the label image, and the image size may be set to expand according to this one expansion quantity, for the four directions of the image upward direction, the image downward direction, the image leftward direction, and the image rightward direction. In the invention, this configuration can be combined with the configuration of performing the borderless printing of the print image on the surface of any of the various mediums described in the other embodiment 1.

(3-4) Other Embodiment 4

Still furthermore, the first and second embodiments are described above by using the case where controllers 5 and 51 of respective image processing apparatuses 1 and 50 execute respective first and second image processing procedures RT1 and RT2 that are described with reference to FIG. 16, FIG. 17, and FIG. 21, respectively. In this case, first and second image processing procedures RT1 and RT2 are executed according to the first and second image processing programs (i.e., the first and second printer drivers) pre-stored in storages 7 and 52. However, the invention is not limited to this case. For example, controllers 5 and 51 of respective image processing apparatus 1 and 50 may execute respective first and second image processing procedures RT1 and RT2, by installing the first and second image processing programs from a computer-readable storage medium storing the first and second image processing programs, or by installing the first and second image processing programs from outside via a wire or wireless communication medium such as a local area network, the Internet, and digital satellite broadcasting. The computer-readable storage medium is used for installing the first and second image processing programs onto image processing apparatuses 1 and 50 and thereby bringing the first and second image processing programs into an executable state. The computer-readable storage medium may be implemented by, for example, a package medium such as a flexible disk, a compact disc-read only memory (CD-ROM), or a digital versatile disc (DVD). Alternatively, the computer-readable storage medium may be implemented by, for example, a semiconductor memory, a magnetic disk, or the like, that temporarily or permanently stores the first and second image processing programs. Further, for a way of storing the first and second image processing programs into the computer-readable storage medium, there may be used a wire or wireless communication medium such as a local area network, the Internet, and digital satellite broadcasting. Furthermore, the computer-readable storage medium may store the first and second image processing programs via any one of various communication interfaces such as a router and a modem.

(3-5) Other Embodiment 5

Further, the first and second embodiments are described above, by using the case where the image processing apparatus according to the invention is applied to image processing apparatus 1 and 50 described with reference to FIG. 1 to FIG. 21 and each is configured as a personal computer. However, the invention is not limited to this case. For example, the invention is widely applicable to other types of variously configured image processing apparatus. Examples of such image processing apparatus include information processors each having an image processing function, such as a computer and an information processing terminal. The examples further include image formation apparatuses each having an image processing function and performing image processing on print data obtained from outside, such as a printer, a multi-function peripheral (MFP), a facsimile, a multifunction printer, and a copier.

(3-6) Other Embodiment 6

Furthermore, the first and second embodiments are described above, by using the case where controllers 5 and 51 described above with reference to FIG. 1 to FIG. 21 are each used as the data-loading unit that loads print data of a print image including one or more pieces of image data. However, the invention is not limited to this case. For example, other types of data-loading units variously configured may be widely used. Examples of the data-loading units variously configured include a microprocessor and a digital signal processor (DSP), as well as, a reception unit that receives print data transmitted from outside, and a data-loading circuit having a hardware circuit configuration that loads print data of a print image including one or more pieces of image data.

(3-7) Other Embodiment 7

Still furthermore, the first and second embodiments are described above, by using the case where controllers 5 and 51 described above with reference to FIG. 1 to FIG. 21 are each used as the expansion-target detector that detects image data targeted for expansion from image data included in print data. However, the invention is not limited to this case. For example, other types of expansion-target detectors variously configured may be widely used. Examples of the expansion-target detectors variously configured include a microprocessor and a DSP, as well as, an expansion-target detection circuit having a hardware circuit configuration that detects image data targeted for expansion from image data included in print data.

(3-8) Other Embodiment 8

Further, the first and second embodiments are described above, by using the case where controllers 5 and 51 described above with reference to FIG. 1 to FIG. 21 are each used as the identification unit that identifies a characteristic of an image based on image data targeted for expansion. However, the invention is not limited to this case. For example, other types of identification units variously configured may be widely used. Examples of the identification units variously configured include a microprocessor and a DSP, as well as, an identification unit that identifies the presence/absence and shape of an outline, drawing range, color, and/or the like of an image based on image data targeted for expansion, as a characteristic. The examples further include an identification circuit having a hardware circuit configuration that identifies a characteristic of an image based on image data targeted for expansion.

(3-9) Other Embodiment 9

Furthermore, the first and second embodiments are described above, by using the case where controllers 5 and 51 described above with reference to FIG. 1 to FIG. 21 are each used as an expansion processor that performs expansion processing on image data targeted for expansion according to a characteristic of an image based on the image data targeted for expansion, thereby generating expansion image data. However, the invention is not limited to this case. For example, other types of expansion processors variously configured may be widely used. Examples of the expansion processors variously configured include a microprocessor and a DSP, as well as, an expansion processing circuit having a hardware circuit configuration that performs expansion processing on image data targeted for expansion according to a characteristic of an image based on the image data targeted for expansion, thereby generating expansion image data.

(3-10) Other Embodiment 10

Still furthermore, the first and second embodiments are described above, by using the case where controllers 5 and 51 described above with reference to FIG. 1 to FIG. 21 are each used as an expansion-print-data generator that generates expansion print data based on expansion image data. However, the invention is not limited to this case. For example, other types of expansion-print-data generators variously configured may be widely used. Examples of the expansion-print-data generators variously configured include a microprocessor and a DSP, as well as, an expansion-print-data generation circuit having a hardware circuit configuration that generates expansion print data based on expansion image data.

(3-11) Other Embodiment 11

Further, the first and second embodiments are described above, by using the case where storage units 7 and 52 described above with reference to FIG. 1 to FIG. 21 are each used as a storage unit that stores expansion information of expansion image data generated by performing expansion processing on image data targeted for expansion by an expansion processor. However, the invention is not limited to this case. For example, other types of storage units variously configured may be widely used. Examples of the storage units variously configured include a semiconductor memory and a storage device detachably attachable to an image processing apparatus.

(3-12) Other Embodiment 12

Furthermore, the first and second embodiments are described above, by using the case where controllers 5 and 51 described above with reference to FIG. 1 to FIG. 21 are each used as a determination unit that determines whether expansion information stored in a storage unit is usable for expansion processing of other image data targeted for expansion which are included in other print data. However, the invention is not limited to this case. For example, other types of determination units variously configured may be widely used. Examples of the determination units variously configured include a microprocessor and a DSP, as well as, a determination circuit having a hardware circuit configuration that determines whether expansion information stored in a storage unit is usable for expansion processing of other image data targeted for expansion which are included in other print data.

The invention may be used for an image processing apparatus such as a personal computer, an information processing terminal, a printer, a MFP, a facsimile, a multi-function printer, or a copier.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. An image processing apparatus comprising:
   a reception processor configured with a first program that, when executed by the reception processor, causes the reception processor to perform first operations comprising receiving image data corresponding to an image, wherein the image data includes a plurality of image objects; and
   a controller configured with a second program that, when executed by the controller, causes the controller to perform second operations comprising
       determining whether ones of the plurality of image objects are in contact with a boundary line of a printing area of medium, and
       based on a result of the determination,
           performing expansion processing on one of the plurality of image objects that is in contact with the boundary line of the printing area of the medium to expand the one of the plurality of image objects that is in contact with the boundary line of the printing area and not performing expansion processing on an other one of the plurality of image objects that is not contact with the boundary line of the printing area of the medium such that the other one of the plurality of image objects that is not in contact with the boundary line of the printing area is not expanded, and
           generating and outputting expansion image data including both the expanded one of the plurality of image objects on which expansion processing is performed and the other one of the plurality of image objects on which expansion processing is not performed.

2. The image processing apparatus according to claim 1, wherein
   the controller is further configured by the second program to cause the controller to perform second operations further comprising
       discriminating a type of each of the plurality of image objects,
       determining whether each of the plurality of image objects is targeted for the expansion processing based on a result of the discrimination of the type of each of the plurality of image objects and the result of the determination, and
       performing the expansion processing on each of the targeted ones of the plurality of image objects based on a result of the determination.

3. The image processing apparatus according to claim 2, wherein
   the type of the plurality of image objects comprises a first type and a second type;
   the type of the targeted ones of the plurality of image objects comprises the first type; and
   the type of the ones of the plurality of image objects that are not targeted comprises the second type.

4. The image processing apparatus according to claim 3, wherein the first type comprises a line type or a graphic type.

5. The image processing apparatus according to claim 3, wherein the second type comprises a character type or a bitmap type.

6. The image processing apparatus according to claim 1, wherein
   the image data comprises data for label printing; and
   the printing area comprises a label printing area.

7. The image processing apparatus according to claim 1, further comprising:
   a storage device that stores expansion information about the image object on which the expansion processing is performed, wherein
   the controller is further configured by the second program to cause the controller to perform second operations such that performing the expansion processing comprises performing expansion processing on one of the plurality of image objects by using the expansion information stored in the storage device.

8. The image processing apparatus according to claim 1, wherein the controller is further configured by the second program to cause the controller to perform second operations such that performing expansion processing on one of the plurality of image objects and not performing expansion processing on an other one of the plurality of image objects, thereby generating and outputting expansion print data comprises:

determining a first straight line passing through a first position and a second position on the one of the plurality of image objects to be expanded, the first straight line determined based on first coordinates of the first position in contact with a boundary line of a printing area of a medium, and second coordinates of the second position next to first dot position in the printing area of the medium, determining where the first straight line intersects an expansion-area boundary, determining a second straight line passing through a fourth position and a third position on the first straight line, the fourth position in contact with the expansion-area boundary, and generating the expansion image data based on expanding the first straight line to include the second straight line.

* * * * *